United States Patent [19]

Kanno et al.

[11] Patent Number: 4,987,021
[45] Date of Patent: Jan. 22, 1991

[54] OPTICAL INFORMATION RECORDING MEDIUM

[75] Inventors: Toshiyuki Kanno; Hitoshi Watanabe, both of Tokyo, Japan

[73] Assignee: Olympus Optical Co., Ltd., Tokyo, Japan

[21] Appl. No.: 380,690

[22] Filed: Jul. 13, 1989

Related U.S. Application Data

[63] Continuation of Ser. No. 18,946, Feb. 24, 1987, abandoned.

[30] Foreign Application Priority Data

Feb. 28, 1986 [JP] Japan .................................. 61-43747
Feb. 28, 1986 [JP] Japan .................................. 61-43748

[51] Int. Cl.$^5$ .............................................. B32B 3/00
[52] U.S. Cl. .................................. 428/64; 428/65; 428/913; 430/495; 430/945; 367/288
[58] Field of Search .................. 428/64, 65, 913; 430/945, 495; 369/288

[56] References Cited

U.S. PATENT DOCUMENTS 4,600,625 7/1986 Abe et al. .......................... 428/167

FOREIGN PATENT DOCUMENTS

| | | | |
|---|---|---|---|
| 24692 | 2/1984 | Japan | 430/945 |
| 071046 | 2/1984 | Japan . | |
| 55795 | 3/1984 | Japan . | |
| 67092 | 4/1984 | Japan | 430/945 |
| 131211 | 4/1986 | Japan . | |
| 2165658 | 4/1986 | United Kingdom . | |

*Primary Examiner*—Patrick J. Ryan
*Attorney, Agent, or Firm*—Frishauf, Holtz, Goodman & Woodward

[57] ABSTRACT

An optical information recording medium has an optical information recording layer and a carrier for carrying said recording layer. The recording layer contains at least one organic dye represented by a formula:

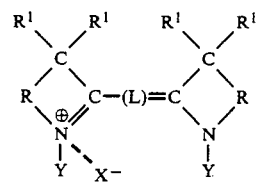

where R is a substituted or nonsubstituted phenylene group or naphthylene group, L is a methyne-based group, and Y is an unsaturated organic group.

21 Claims, 1 Drawing Sheet

OPTICAL INFORMATION RECORDING MEDIUM

This application is a continuation of application Ser. No. 07/018,946, filed Feb. 24, 1987, now abandoned.

BACKGROUND OF THE INVENTION

1. Field of the Invention

The present invention relates to an optical information recording medium subjected to information write or read access with a laser, especially a semiconductor laser.

2. Description of the Prior Art

In a conventional optical disk, optically detectable pits (e.g., a size of about 1 $\mu$m) are formed in a thin recording layer on a substrate to allow high-density recording of information in spiral or concentric tracks. In order to write information on such a disk, a laser spot formed on a laser-sensitive layer is scanned to form pits on only the irradiated surface portions. In this case, the pits are formed in a spiral or concentric form. The laser-sensitive layer (recording layer) absorbs laser energy and allows formation of optically detectable pits. For example, in a heat mode write system, a recording layer absorbs laser energy and an irradiated portion is locally heated and subjected to physical changes such as melting/evaporation or coagulation so as to cause an optical difference (e.g., reflectance or absorbance) between the irradiated and nonirradiated portions. Information can be read out by detecting such physical changes.

Examples of the conventional optical recording layer materials are a thin metal film (e.g., an aluminum deposition film), a thin bismuth film, or a thin tellurium film, and an inorganic material such as a chalcogenide-based amorphous glass film. These materials have advantages in that a thin film can be prepared by deposition, sputtering, or the like and has an absorption property in the near-infrared range so as to allow use of a semiconductor laser. However, these materials have disadvantages such as high reflectances, high heat conductances, and high specific heat values. In particular, the high reflectance disables effective utilization of laser energy. Laser energy required for recording must have a high level, and a large-capacity laser source must be used. As a result, the recording apparatus is undesirably bulky and expensive. Furthermore, thin tellurium, bismuth and selenium films are undesirably toxic.

Under these circumstances, extensive studies have been recently made to develop optical memory media using thin dye films as recording layers since dyes provide a wide variety of absorbances, have large absorbances and small heat conductivities, and are easy to prepare and nontoxic. Typical examples of the dye are a cyanine dye (Japanese Patent Disclosure (Kokai) No. 58-112790), an anthraquinone dye (Japanese Patent Disclosure (Kokai) No. 58-224448), a naphthoquinone dye (Japanese Patent Disclosure (Kokai) No. 58-224793), and a phthalocyanine dye (Japanese Patent Disclosure (Kokai) No. 60-48396). These dyes may be used singly, mixed with a self-oxidizable resin, or used in the form of a composition obtained by chemically bonding such a dye to a self-oxidizable resin. The dye material is applied to a substrate by a spinner coating/dipping method, a plasma method, or a vacuum deposition method to prepare an optical recording medium. The thin dye film has the above-mentioned advantages. In particular, the cyanine dye can have a structure for absorbing near-infrared rays and has high solvent solubility and low melting point. Therefore, the cyanine dye has received a great deal of attention.

However, the conventional dyes as described above are subjected to degradation by light, instability against heat, and degradation by humidity. These dyes are thus regarded as posing problems on reservation for long periods of time and read operation stability (stability with respect to read light). Various proposals for solving these problems have been presented. For example, a protective film is formed on the recording layer (Japanese Patent Disclosure (Kokai) Nos. 55-22961 and 57-66541); an antifading material is mixed with the conventional dye (Japanese Patent Disclosure (Kokai) No. 59-557,795); and a metal complex having absorbance in the range of long wavelengths is mixed in the conventional dye to prepare a recording layer (Japanese Patent Disclosure (Kokai) No. 59-215892). These proposals, however, cannot completely solve the problems as described above. These additives undesirably reduce a film formation property, a reflectance, and an absorbance.

Under these circumstances, a coating type recording medium using a cyanine dye represented by the following general formula has received a great deal of attention in favor of a high recording density and a reflectance:

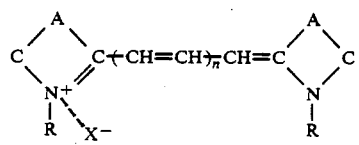

wherein A is O, S, Se, or C; X is a halogen anion, e.g., $BF_4^-$ or $ClO_4^-$; and R is an alkyl group.

The film formation property and thermal/optical stability of the cyanine dye represented by the above general formula are essentially unsatisfactory. As to the film formation property, an increase in the number (n) of methine chains degrades solubility of the cyanine dye in a solvent. Solubility of the dye is changed according to the types of heterocyclic moieties at both ends and the types of substituent. As to thermal/optical stability, an increase in the number of methine chains causes instability against heat and light and oxidative degradation of the dye. Thermal/optical stability is known to vary according to the types of heterocyclic moieties.

SUMMARY OF THE INVENTION

It is, therefore, an object of the present invention to provide a nontoxic optical information recording medium having a high reflectance and high recording sensitivity, capable of stably writing or reading an optical signal, and having high stability against light, sunbeams, and humidity in the read mode.

According to the present invention, there is provided an optical information recording medium comprising:
an optical information recording layer; and
a carrier for carrying said recording layer,
said recording layer comprising at least one organic dye represented by a formula:

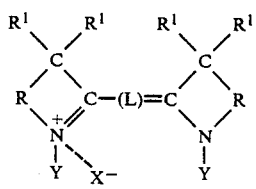 (I)

where R is

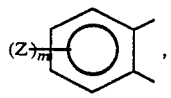

1,2-naphthylene group, 2,3-naphthylene group, or 3,4-naphthylene group;

Z is a hydrogen atom, a halogen atom, an alkyl group having 1 to 18 carbon atoms and preferably 1 to 10 carbon atoms, allyl group, nitro group, hydroxyl group, carboxyl group, an alkoxyl group (e.g. an alkoxyl group having 1 to 10 carbon atoms), —$OCF_3$, —$OSF_3$, —$R^2OH$, —$R^2CHO$, —$R^2COOH$, —$R^2OR^3$, $R^2COR^3$, —$R^2COOR^3$, —$COR^3$, —$COOR^3$,

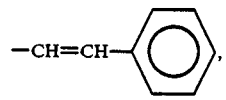

—CH=CH—CN, —$NH_2N(R^3)_2$, —$NHCOCH_3$, or

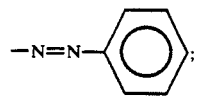

m is an integer of 1 to 4;

$R^1$ is an alkyl group having 1 to 6 carbon atoms, an aralkyl group (e.g., a phenyl $C_1$-$C_6$ alkyl group), or phenyl group;

$R^2$ is an alkylene group having 1 to 20 carbon atoms and preferably 1 to 10 carbon atoms;

$R^3$ is an alkyl group having 1 to 18 carbon atoms and preferably 1 to 10 carbon atoms;

L is

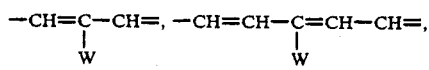

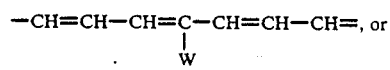

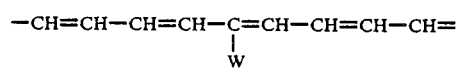

n is 0, 1 or 2;
p is an integer of 1 to 4;

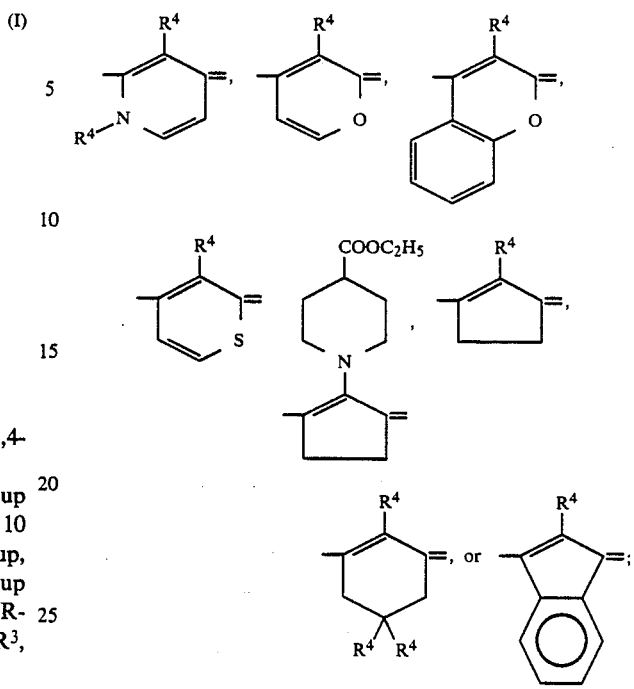

W is a monovalent group;

$R^4$ is a hydrogen atom, a halogen atom, an alkyl group having 1 to 6 carbon atoms, phenyl group, an aralkyl group (e.g., phenyl $C_1$-$C_6$ alkyl group), allyl group,

(where Ph is phenyl), or

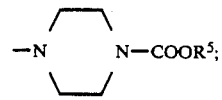

$R^5$ is an alkyl group having 1 to 6 carbon atoms;
X is an anion; and
Y is an unsaturated organic group having 2 to 20 carbon atoms and preferably 2 to 10 carbon atoms.

DETAILED DESCRIPTION OF THE PREFERRED EMBODIMENTS

Figure 1:
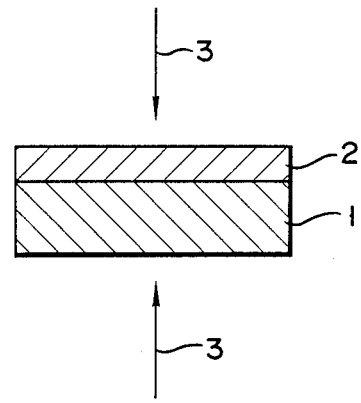
FIGS. 1 to 3 are schematic sectional views showing optical information recording media having different structures according to the present invention.

An optical information recording medium according to the present invention is prepared by forming an organic dye represented by general formula (I) as a layer (i.e., an optical information recording layer) on a proper carrier or substrate, as described later in detail.

In general formula (I), X is a perchlorate anion, a fluoroborate anion, an iodide anion, a bromide anion, or a p-toluenesulfonate anion. X is preferably a perchlorate anion or an iodide anion.

Y improves solvent solubility of the organic dye, a film formation property thereof on the substrate, and wettability thereof with the substrate. In particular, an improvement in wettability with the substrate increases adhesion strength of a recording layer on the substrate. Y also increases a recording density of a recording layer containing the organic dye. Examples of functional group Y of 2 to 20 carbon atoms having an unsaturated bond are an allyl group, a vinyl group, an allylidene group, an allyloxy group, a crotonoyl group, a styryl group, a vinylidene group, a vinylene group, a diene group, a methylidine group, an acryloyl group, a methacryloyl group, an isopropenyl group, an ethynyl group, and a butenyl group. They may be substituted ones. In these functional groups Y, when the number of carbon atoms is increased, the film formation property of the dye can be improved, but its moisture resistance is degraded. Therefore, the number of carbon atoms in the straight chain moiety is preferably 2 to 9.

R in general formula (I) serves to improve spectral characteristics, light resistance, and chemical stability of the dye. If R is

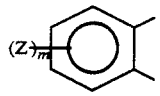

the solubility and film formation property of the dye can be further improved when Z has a larger number of carbon atoms and has a straight chain. Z can be substituted at the 4-, 5-, or 6-position. In particular, the 5-position allows easy substitution and is preferable.

The organic dye represented by general formula (I) includes an organic dye represented by general formula (II) below:

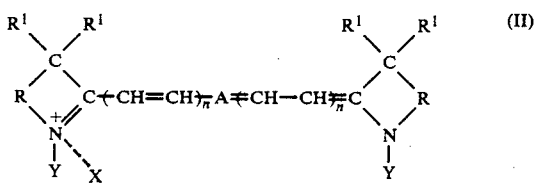

wherein each of R, $R^1$, X, Y, A, and n are as defined in formula (I), and an organic dye represented by general formula (III):

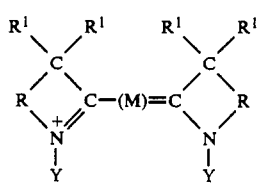

wherein M is

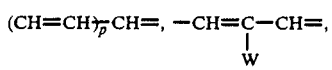

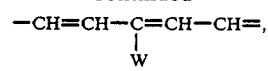

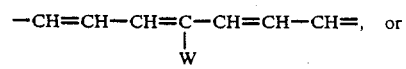

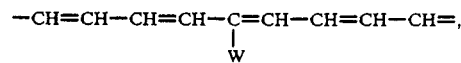

and each of R, $R^1$, X, Y, W, and p is the same as in formula (I).

In the dye represented by formula (II), group A is present in a methine chain. This dye has improved heat resistance and light resistance as compared with a similar dye without group A (e.g., a cyanine dye disclosed in Japanese Patent Disclosure (Kokai) No. 59-85791:

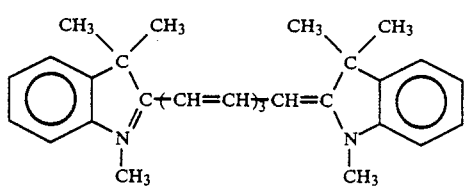

Therefore, the dye represented by formula (II) can be used to form a recording layer having good storage properties and less read degradation. $R^4$ in A of the dye represented by formula (II) is as defined above. However, if $R^4$ is a halogen atom, the halogen atom is preferably Cl or Br atom. If $R^4$ is an alkyl group, the alkyl group preferably has 1 to 3 carbon atoms.

Since methine chain group M is contained in the dye represented by formula (III), the spectral properties of the dye are improved. In other words, the reflectance can be increased. Examples of W in formula (III) are a halogen atom such as Cl or Br, a $C_1$-$C_5$ alkyl group such as a methyl group, an alkoxy group such as a methoxy group, a nonsubstituted or substituted aryl group, an alkylamino group, an arylamino group, a dimethylamino group, a diphenylamino group, a methylphenylamino group, a morpholino group, a substituted amino group such as an imidazolidine group, an alkylcarbonyloxy group, a cyano group, a nitro group, a hydroxyl group, a carboxyl group, or

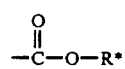

($R^*$ is a $C_1$-$C_5$ alkyl group, a phenyl group, or a substituted phenyl group). In general, in favor of the properties of the resultant film and fabrication convenience, W is a halogen atom such as Cl or Br, a $C_1$-$C_5$ alkyl group, a methoxy group, or a substituted diamino group such as dialkylamino group or diphenylamino group.

The organic dye containing L, Y, and R has better spectral properties (a higher reflectance), higher chemical stability, higher light resistance, higher solvent solubility, better film formation properties, and better wettability with the substrate, than the conventional dyes disclosed in Japanese Patent Disclosure Nos. 58-56239, 58-112790, 58-219091, 58-194595, 59-150795, and 59-124045, represented by the general formula below:

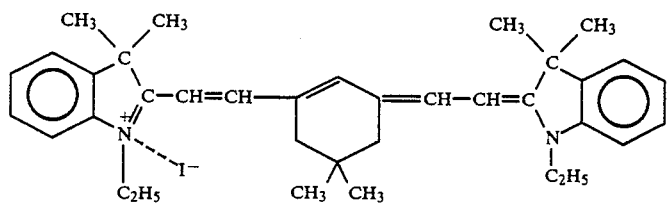

Therefore, by forming a recording layer containing the above organic dye of formula (I), there can be provided an optical information recording medium wherein a noise component of a read signal waveform which is caused by incomplete film formation can be reduced, and the weather resistance (e.g., moisture resistance) and read degradation property are improved. The dye used in the invention can be prepared by a method described in Japanese Patent Disclosure (Kokai) 57-157254 (corresponding to U.S. patent application Ser. No. 237,067 filed on Feb. 23, 1981), with or without modification.

Examples of the dye represented by general formula (II) are those dyes represented by formulas (1) to (60) below.

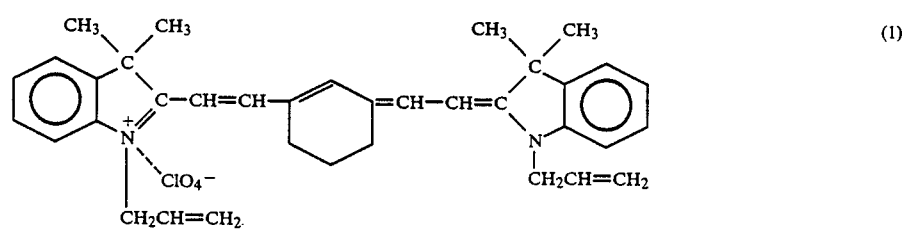

(1)

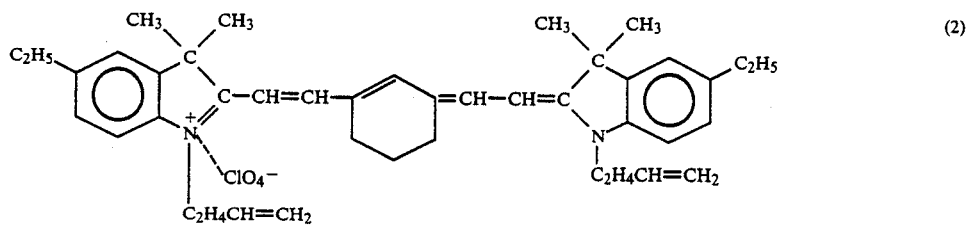

(2)

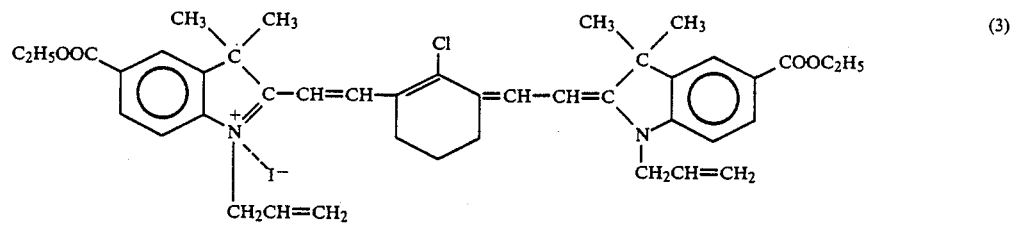

(3)

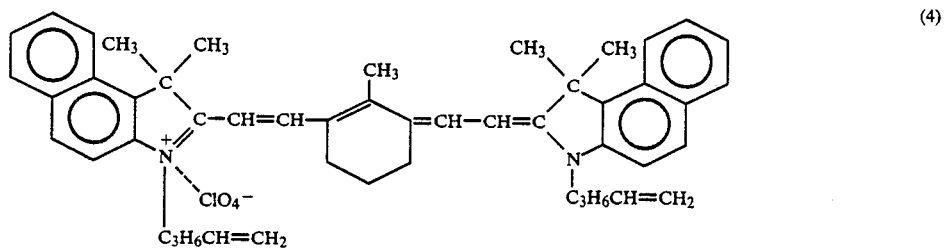

(4)

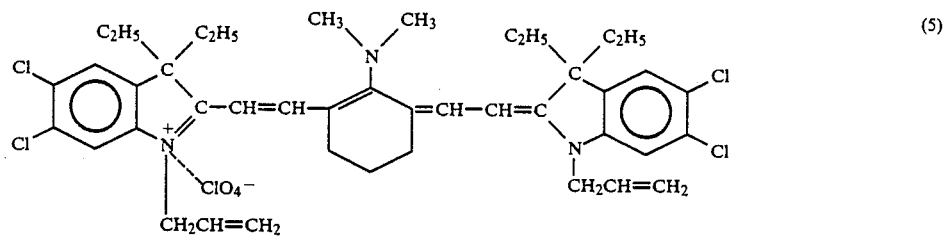

(5)

-continued
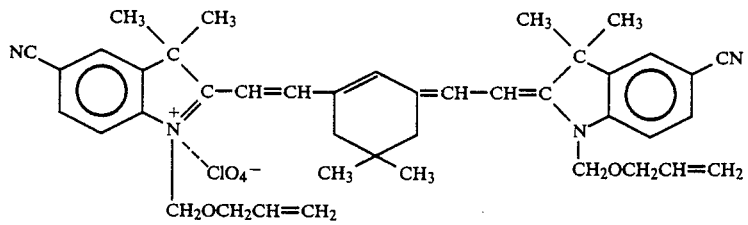
(6)
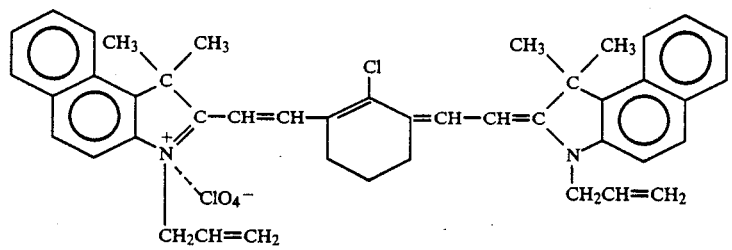
(7)
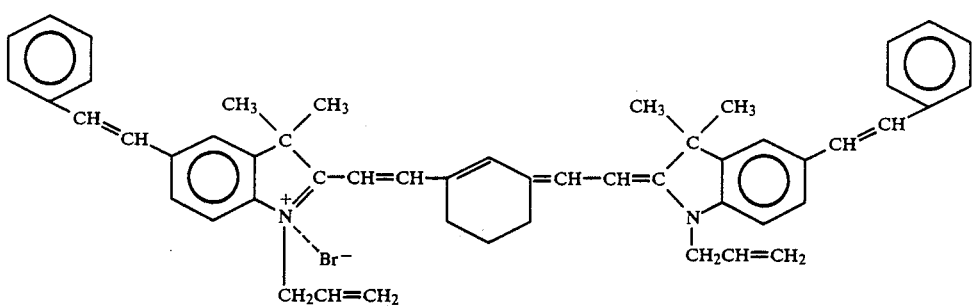
(8)
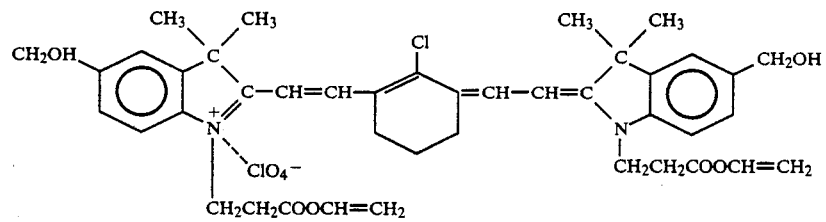
(9)
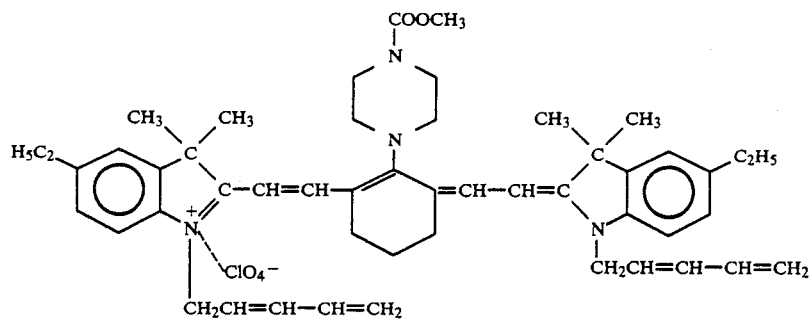
(10)
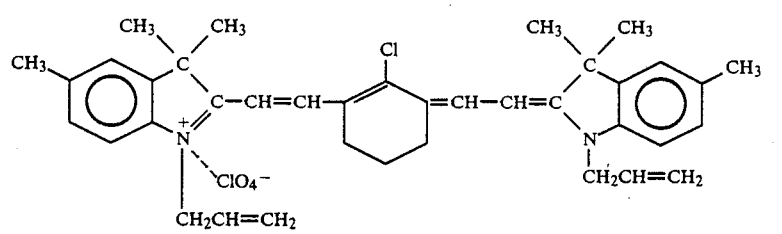
(11)

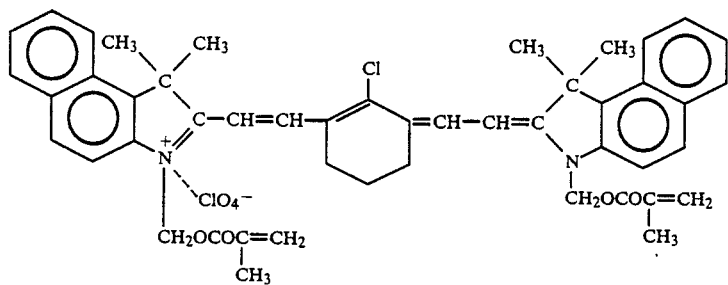
(12)
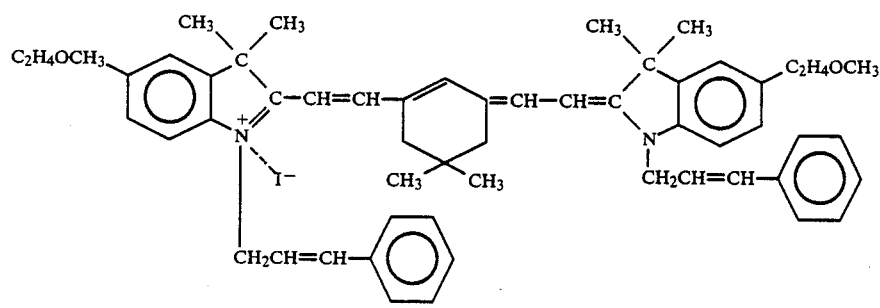
(13)
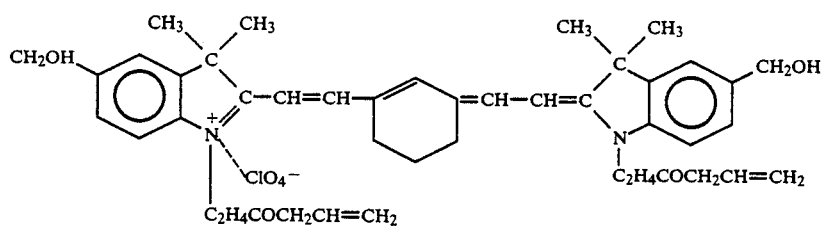
(14)
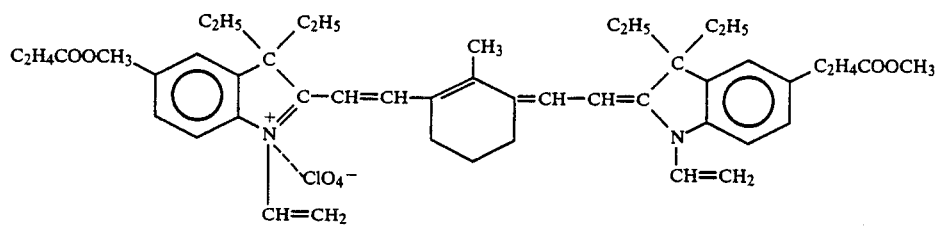
(15)
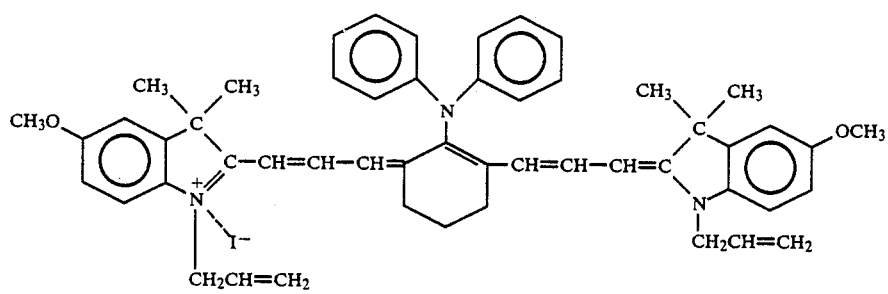
(16)
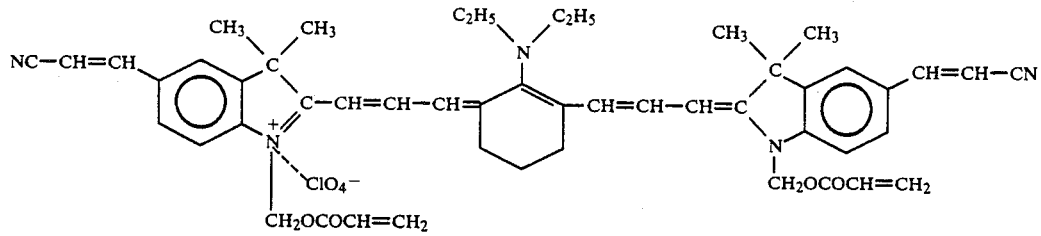
(17)

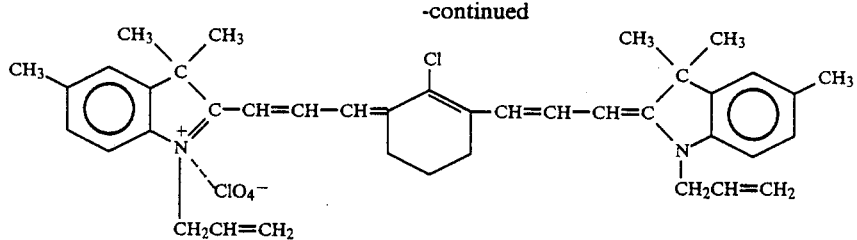
(18)
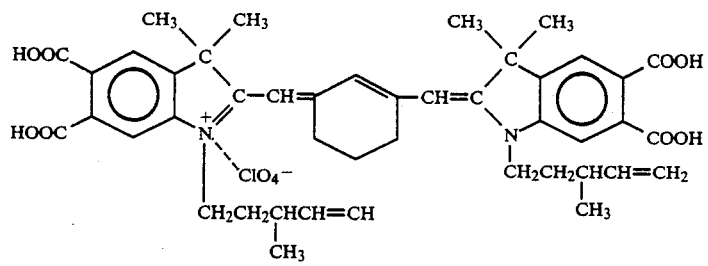
(19)
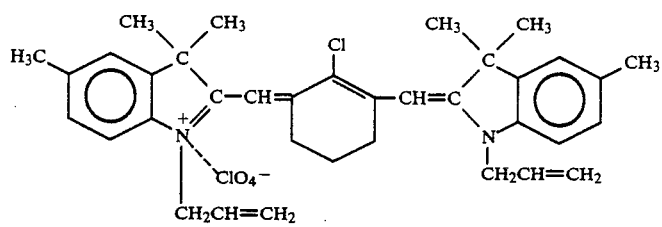
(20)
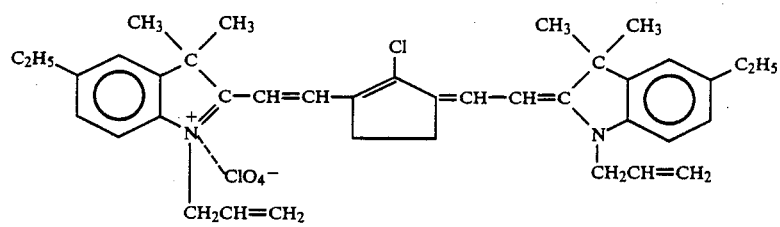
(21)
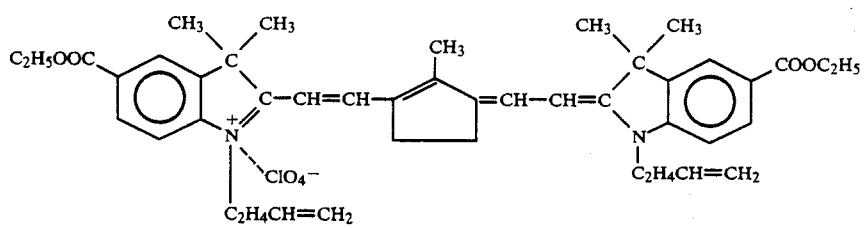
(22)
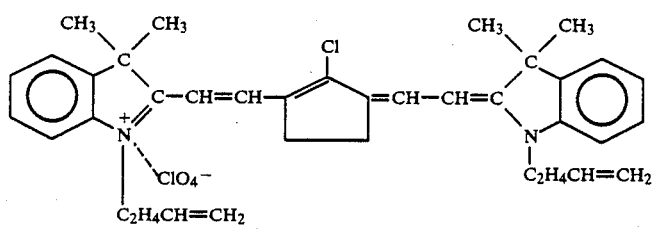
(22a)
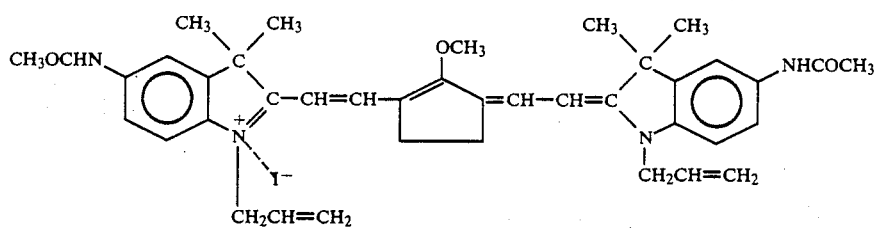
(23)

-continued
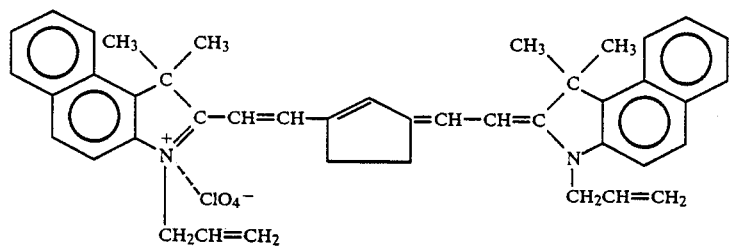 (24)
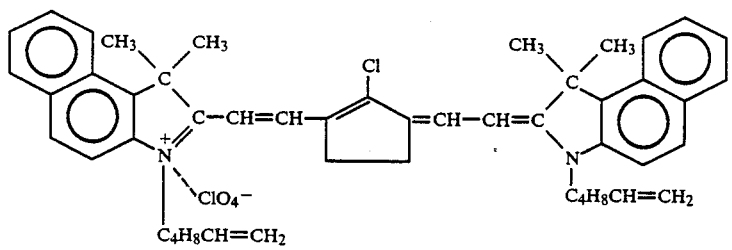 (25)
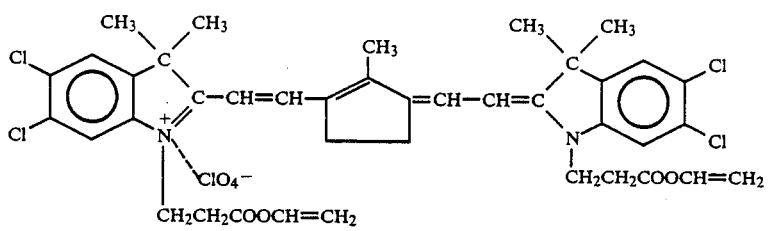 (26)
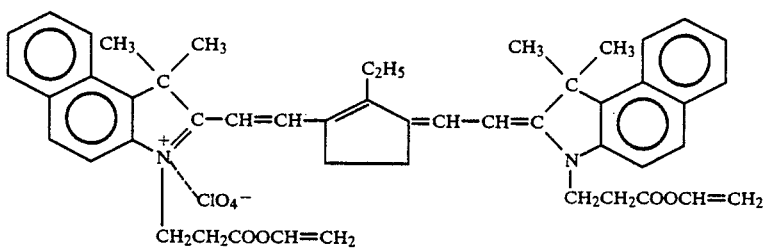 (27)
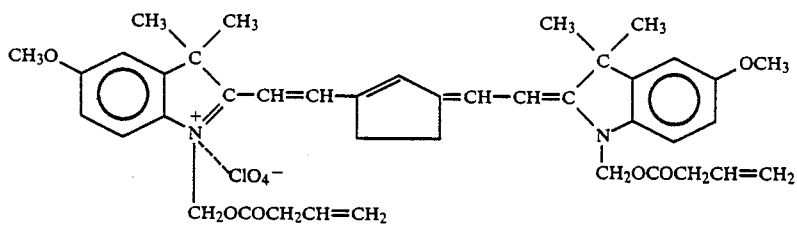 (28)
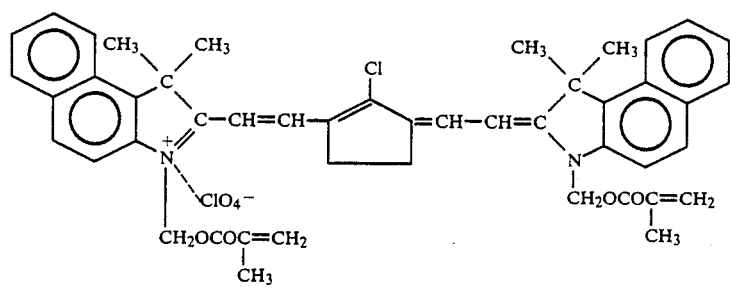 (29)

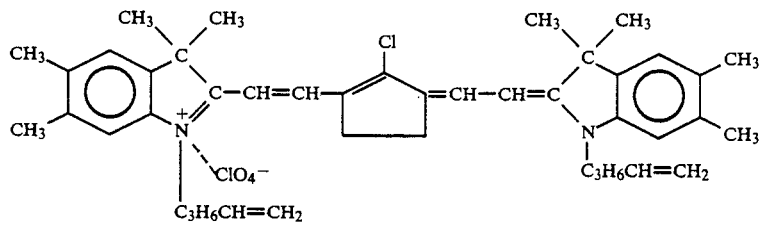
(30)
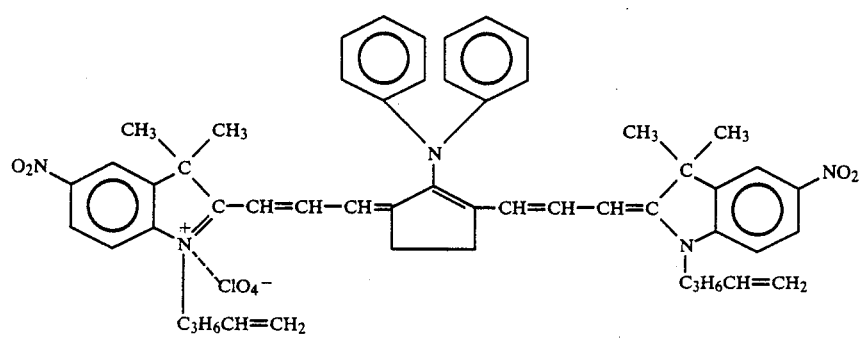
(31)
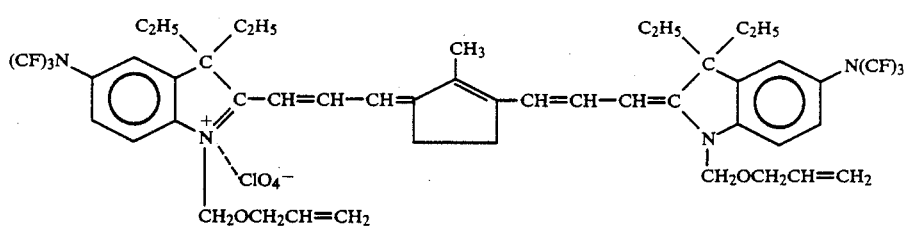
(32)
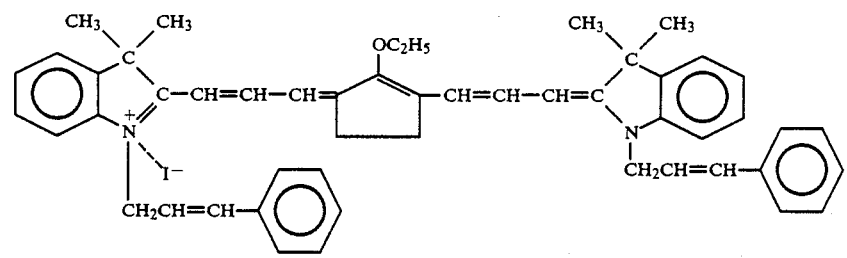
(33)
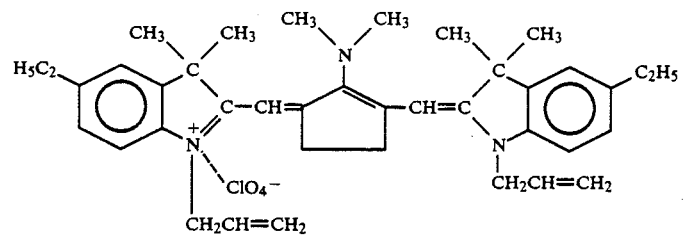
(34)
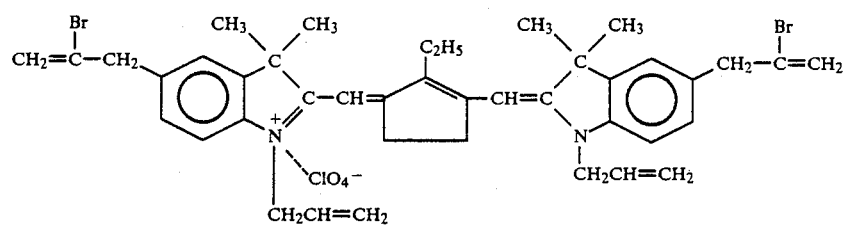
(35)

-continued
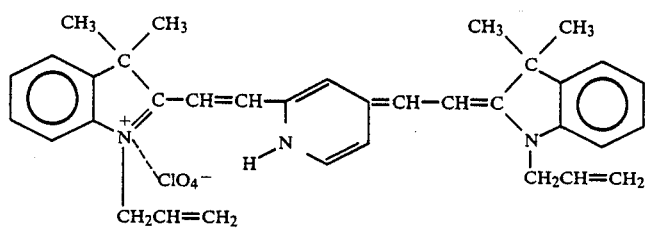 (36)
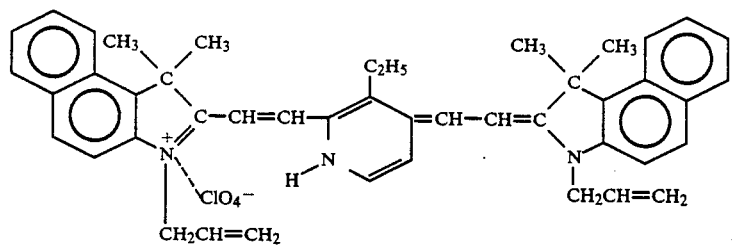 (37)
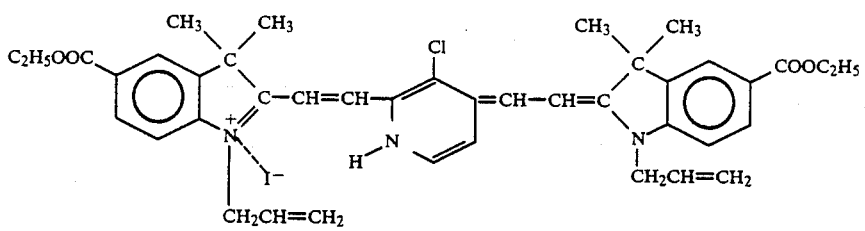 (38)
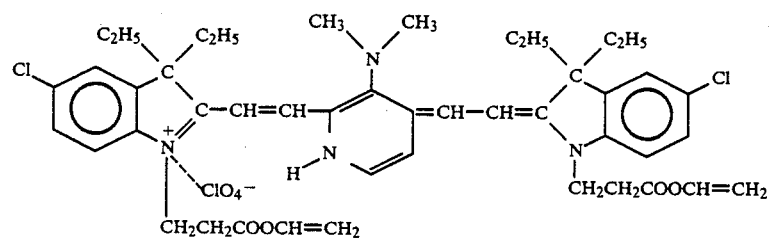 (39)
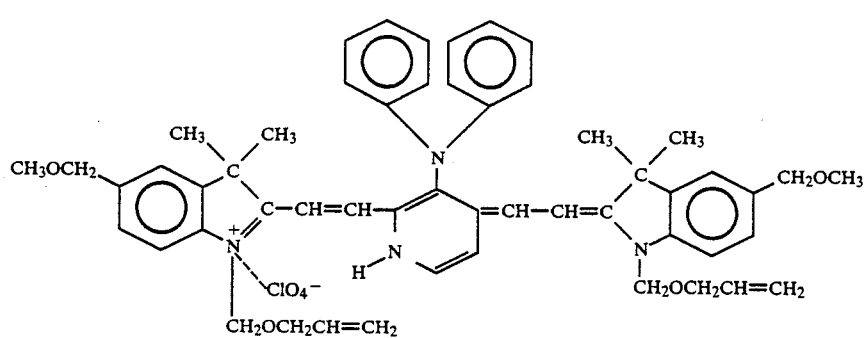 (40)
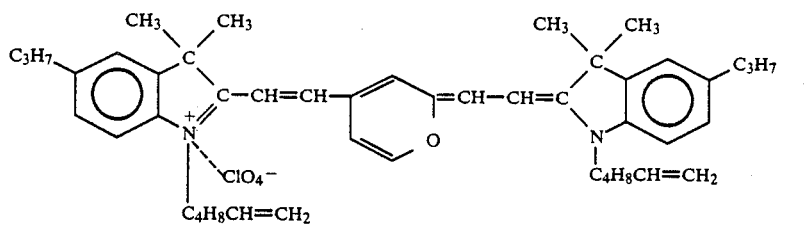 (41)

-continued
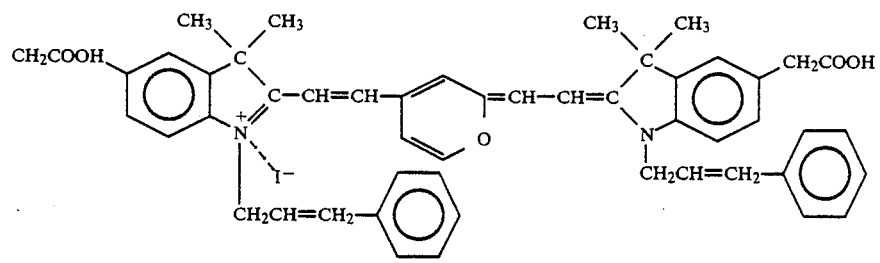 (42)
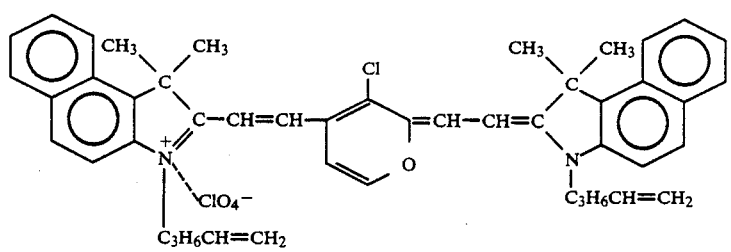 (43)
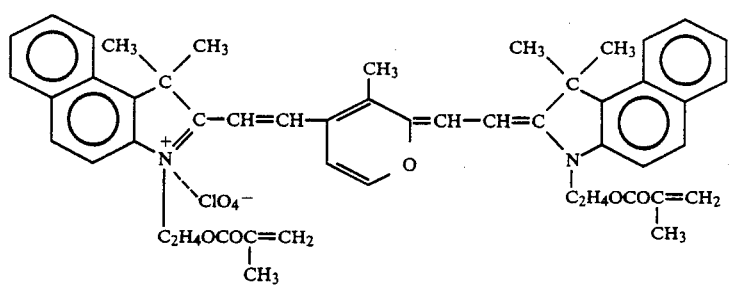 (44)
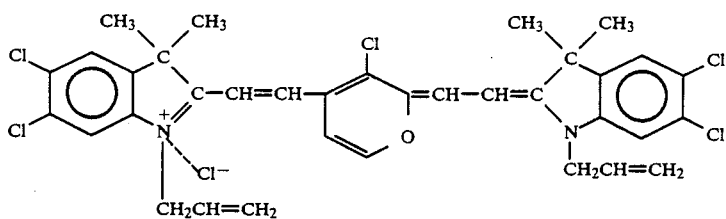 (45)
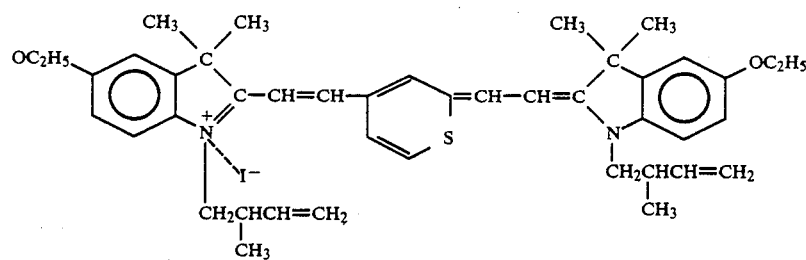 (46)
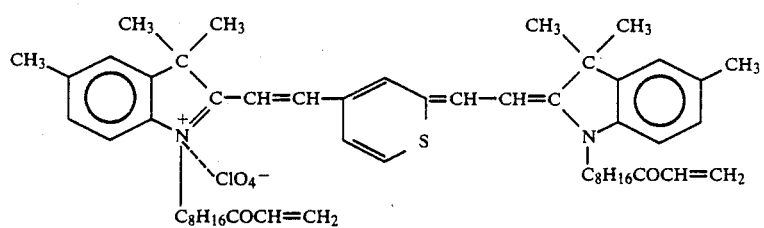 (47)

-continued
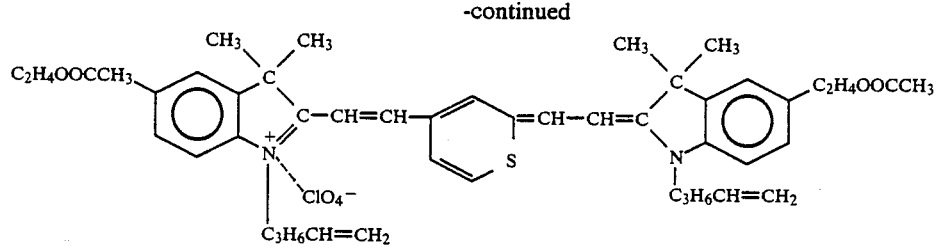
(48)
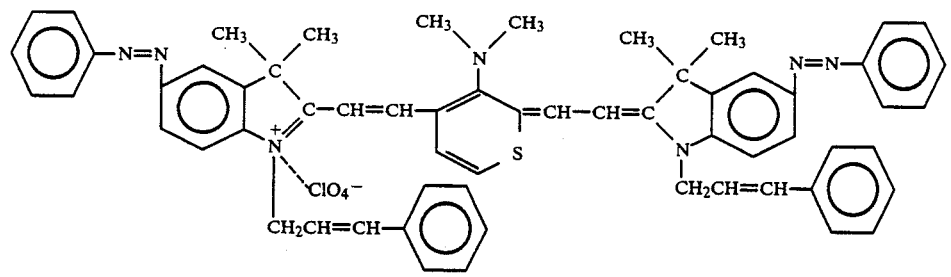
(49)
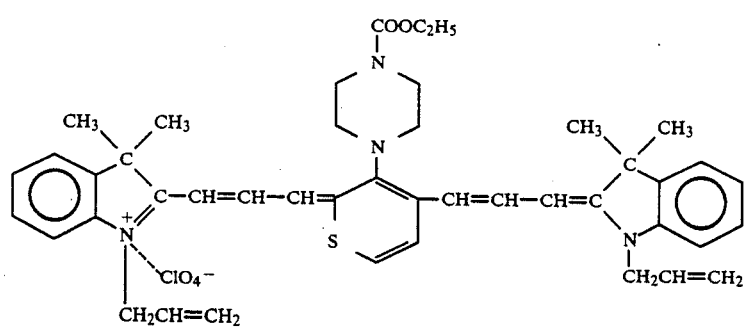
(50)
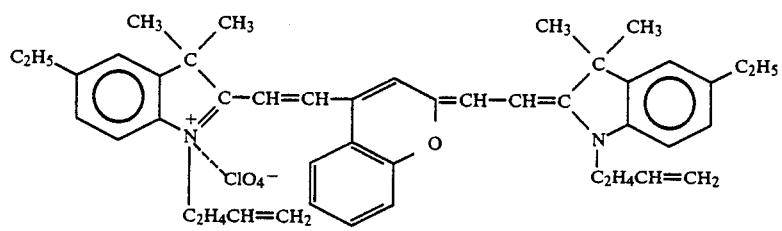
(51)
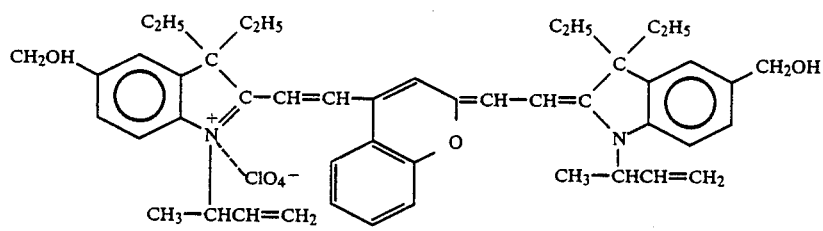
(52)
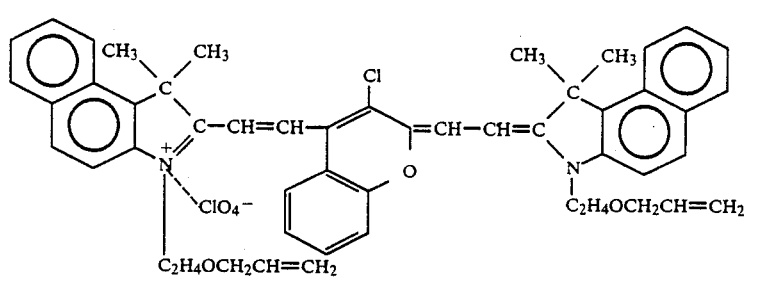
(53)

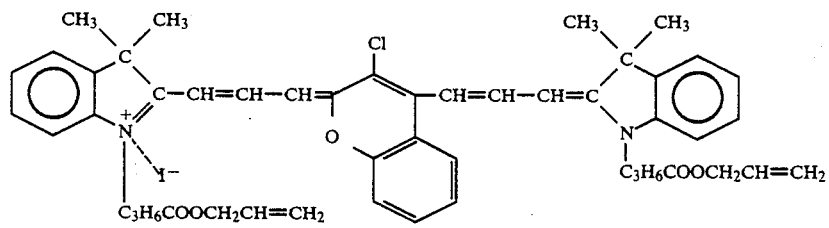
(54)
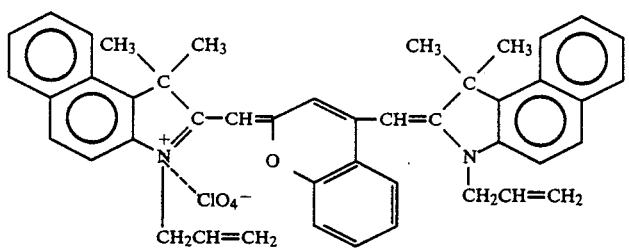
(55)
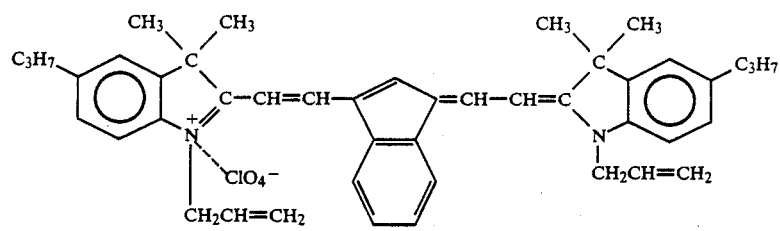
(56)
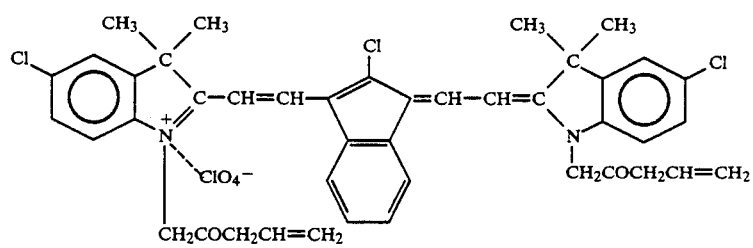
(57)
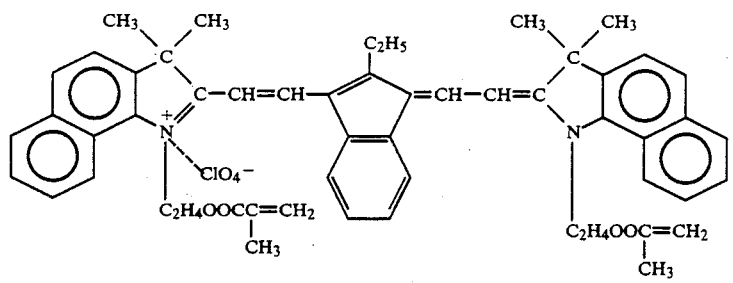
(58)
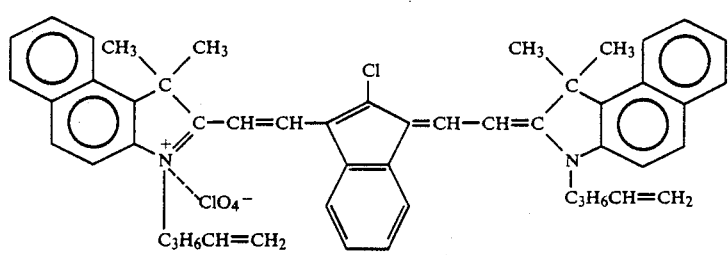
(59)

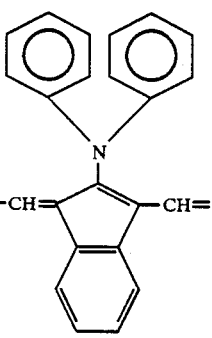
(60)
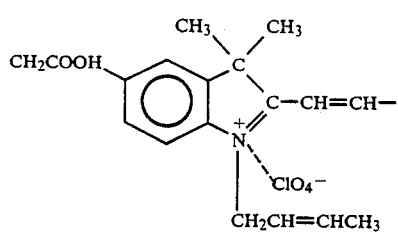
Examples of the dye represented by general formula (III) are those dyes represented by formulas (61) to (96) below.
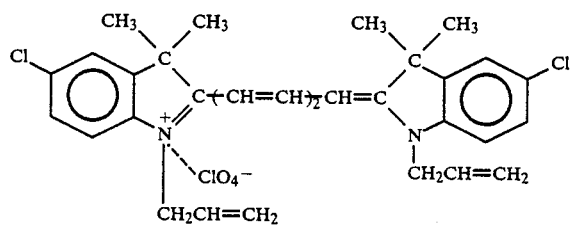
(61)
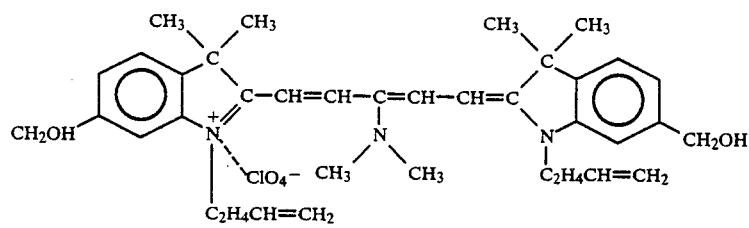
(62)
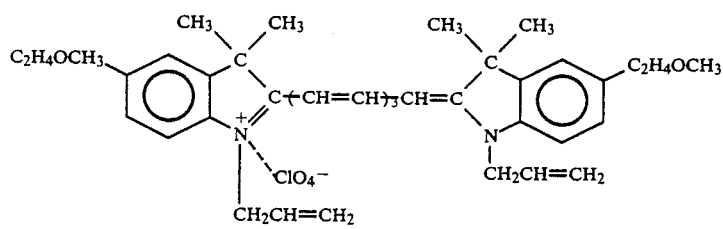
(63)
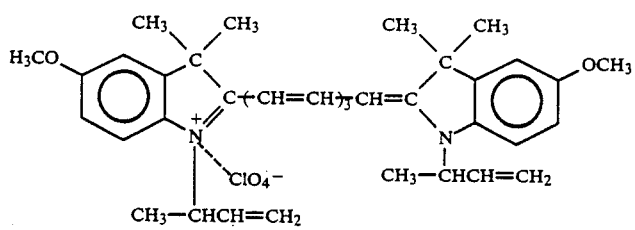
(64)
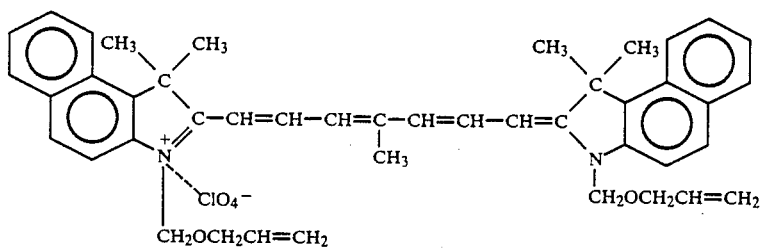
(65)

-continued
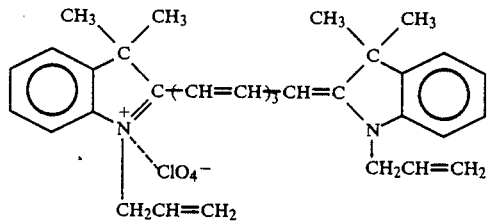 (66)
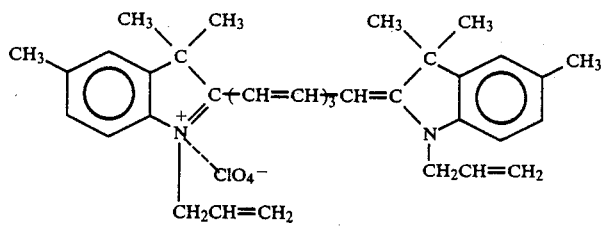 (67)
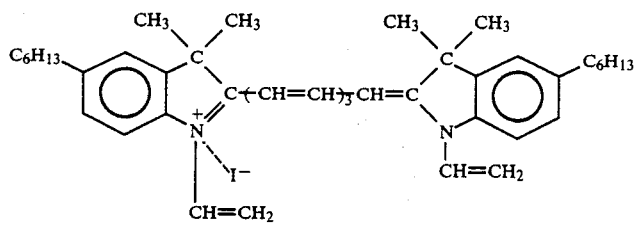 (68)
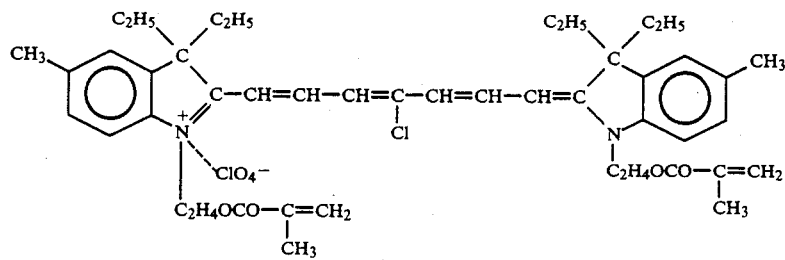 (69)
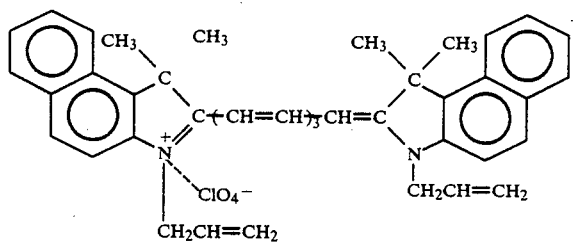 (70)
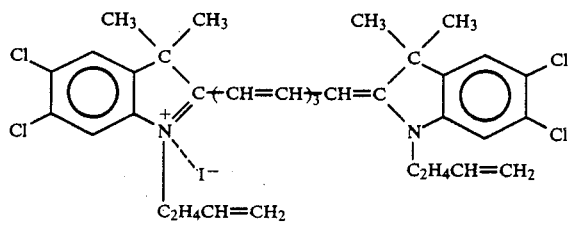 (71)
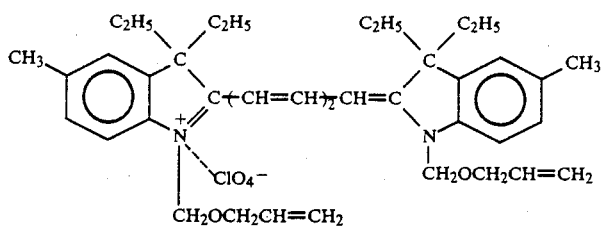 (72)

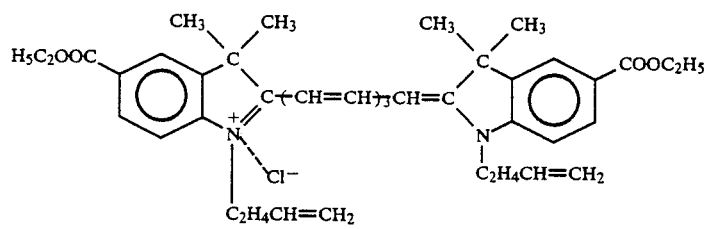
(73)
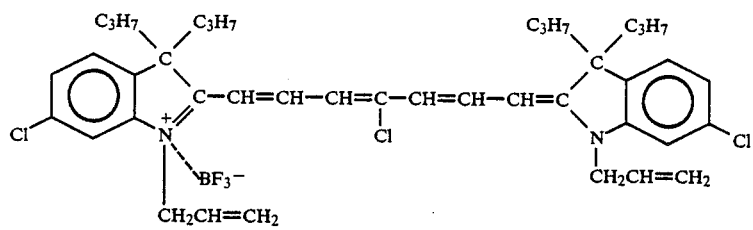
(74)
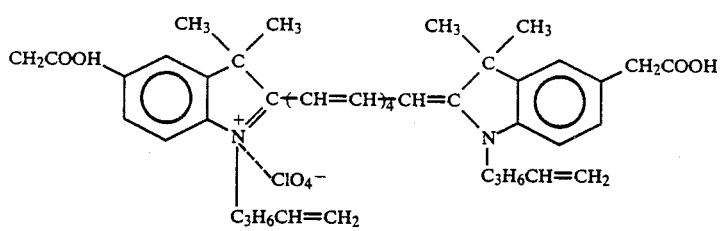
(75)
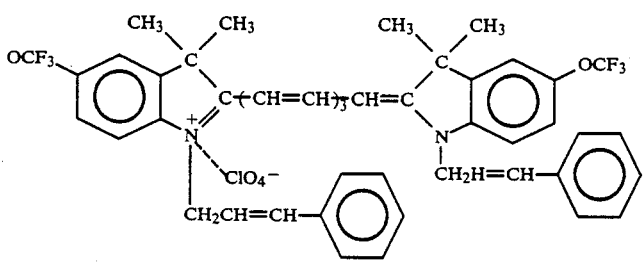
(76)
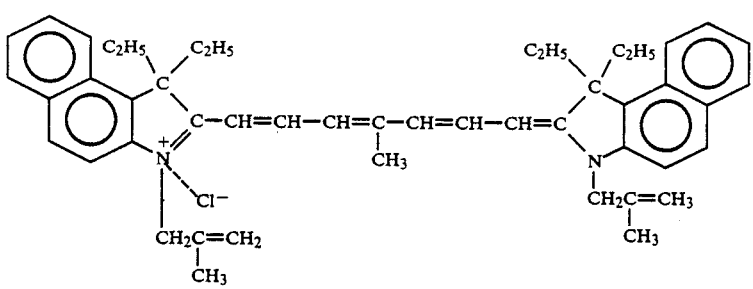
(77)
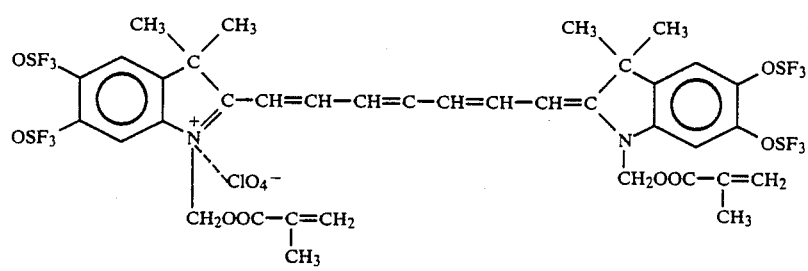
(78)

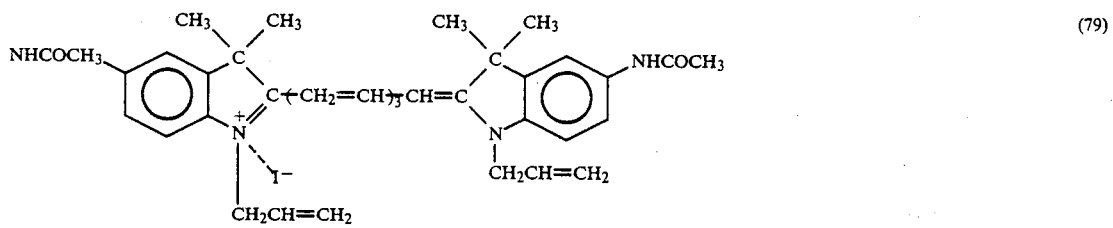
(79)
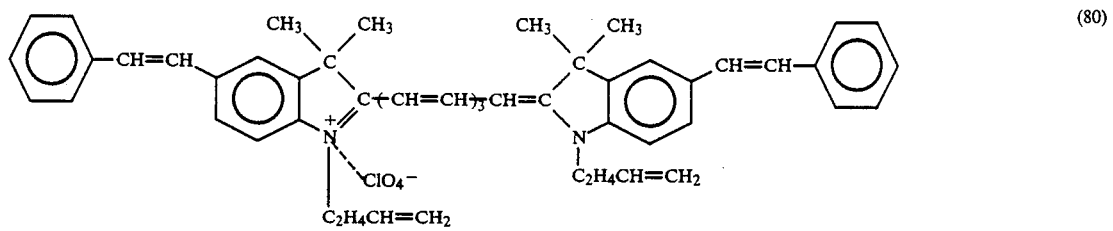
(80)
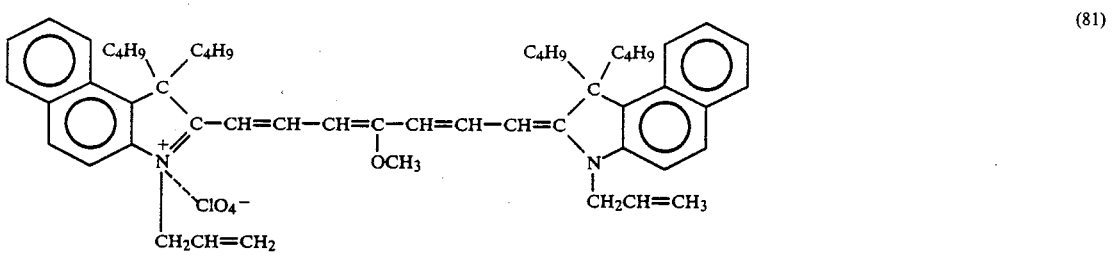
(81)
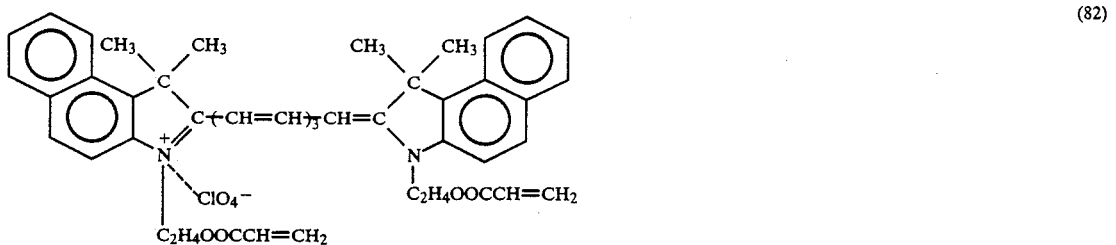
(82)
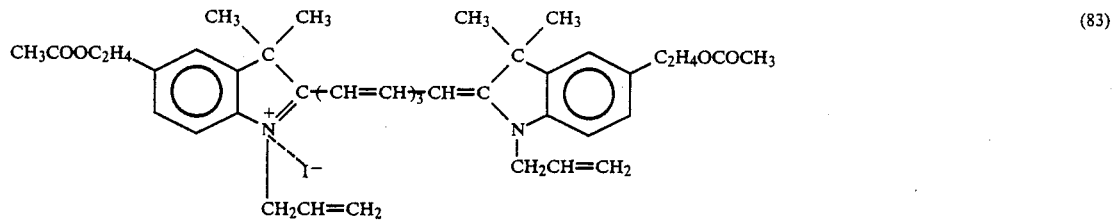
(83)
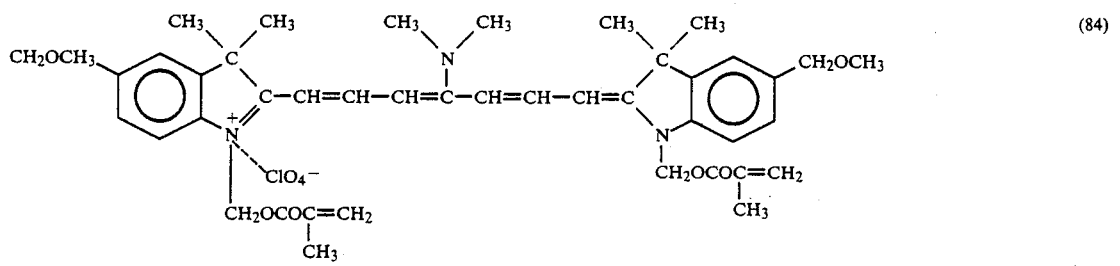
(84)

-continued
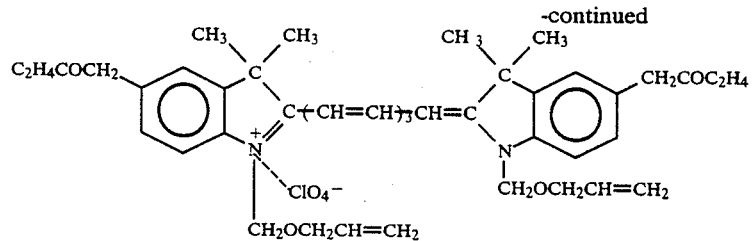 (85)
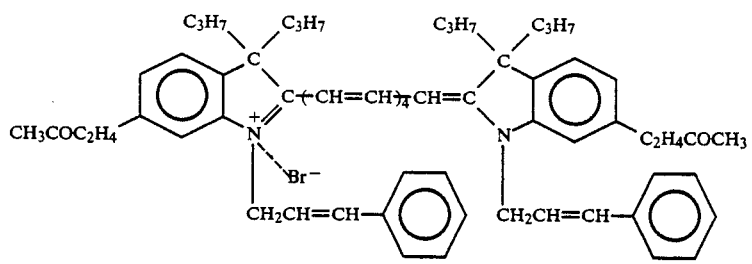 (86)
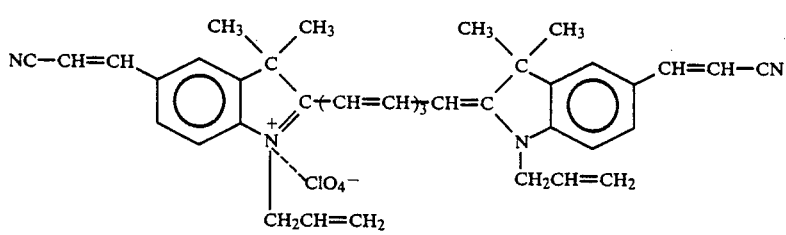 (87)
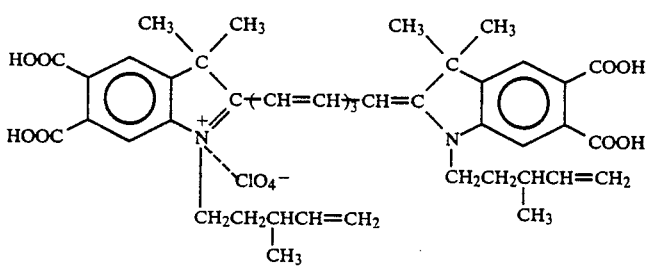 (88)
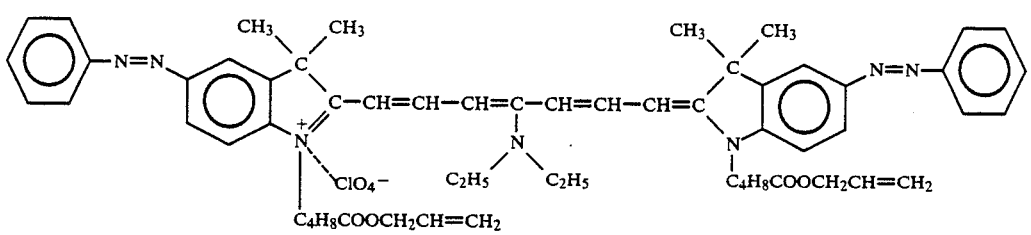 (89)
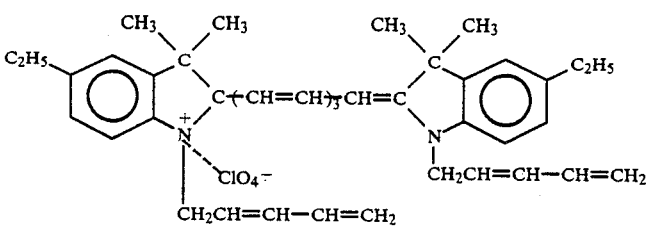 (90)
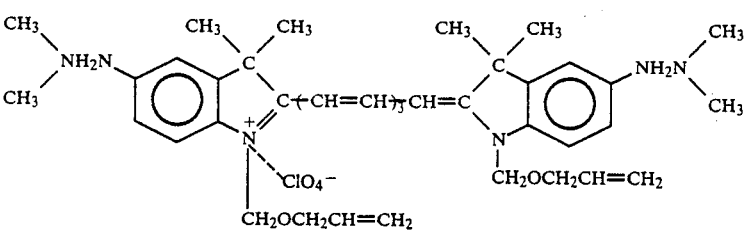 (91)

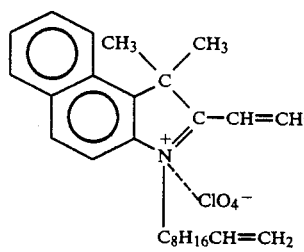 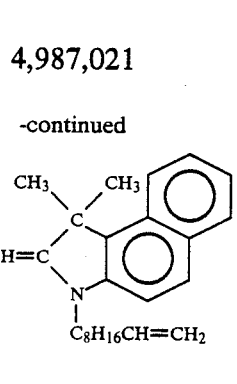 (92)

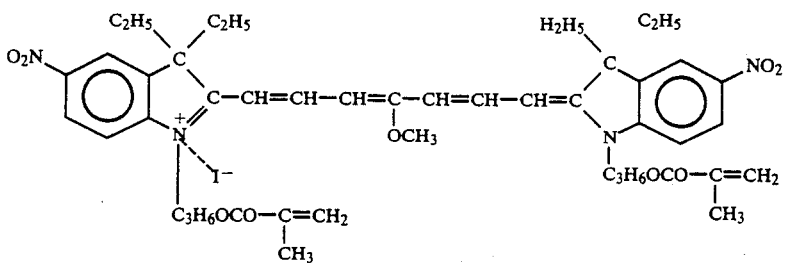 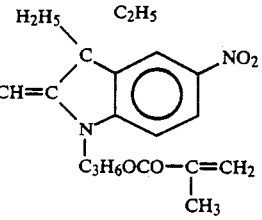 (93)

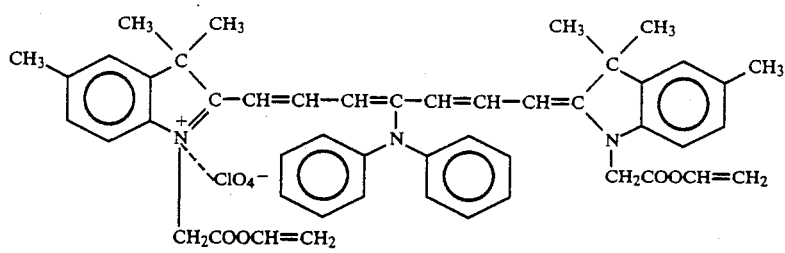 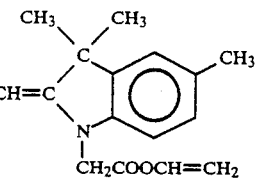 (94)

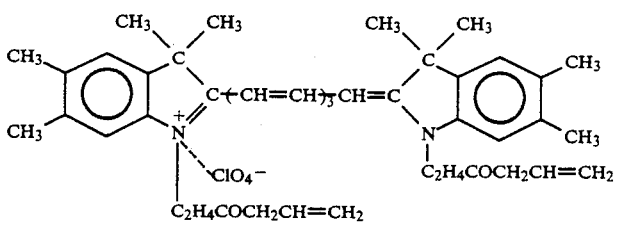 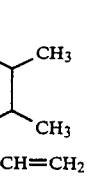 (95)

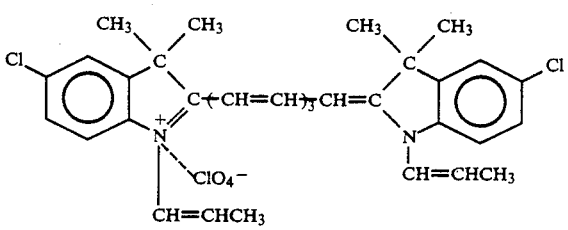  (96)

The recording layers containing dyes according to the present invention are prepared as thin films on corresponding substrates by a spinner method, a dipping method, a doctor blade method, or a roll coater method after the dyes are dissolved in solvents such as ethyl acetate, toluene, acetone, methyl ethyl ketone, methyl isobutyl ketone, methylene chloride, chloroform, dichloroethane, tetrahydrofuran, and alcohol. Recording sensitivity is increased when the thickness of the recording layer is decreased. However, the reflectance of the layer depends on its thickness. It is desirable that the thickness of the recording layer fall within the range of 10 nm to 1,000 nm and, preferably 30 nm to 500 nm.

The substrate comprises: a plastic sheet or plate made of polyester, acrylic resin, polycarbonate resin, polyolefin resin, phenol resin, epoxy resin, polyamide resin, or polyimide resin; a glass plate; or a metal plate.

The recording layer is formed by the method described above. 1 to 40% by weight and, preferably 3 to 20% by weight of a binder resin may be added to the dye to improve film formation properties, heat resistance, and moisture resistance. Examples of the binder resin are acrylic resin, ester resin, nitrocellulose, polyethylene, polypropylene, polycarbonate, polyethylene terephthalate, polyurethane resin, epoxy resin, butyral, polyvinyl chloride, polyvinyl acetate, polystyrene, a copolymer thereof, and a mixture thereof.

Instead of using the binder resin as described above, other dyes may be added to a given dye of the present invention, or dye layers are laminated to constitute a multilayer structure, thereby improving film formation properties, heat resistance, moisture resistance, and light resistance. Therefore, an excellent optical information recording medium having a high recording density, high sensitivity, and long-term durability and being free from read degradation can be prepared. Other dye layer or layers may be stacked on the dye layer of the present invention to improve heat resistance, moisture resistance and optical resistance. Examples of the dye used together with the dye of the present invention are a cyanine dye, a merocyanine dye, an anthraquinone dye, a triphenylmethane dye, a xanthene dye, and a thalocyanine dye. In particular, the dye which may be used together with the dye of the present invention is preferably a naphthalocyanine compound represented by general formula (I) described in U.S. patent application Ser. No. 879,470 filed on June 27, 1986, entitled "OPTICAL INFORMATION RECORDING MEDIUM". The disclosure of the U.S. patent application is incorporated herein by reference.

Amine compounds represented by general formulas (A) and (B) and a dithiolate metal complex represented by general formula (C) may be added to the dye of the present invention to prevent the recording layer from degrading in optical characteristics which is caused by light, oxygen or moisture:

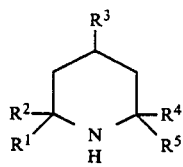
(A)

wherein each of $R^1$, $R^2$, $R^4$, and $R^5$ is independently an alkyl group having 1 to 6 carbon atoms, $R^3$ is

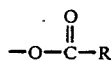

or

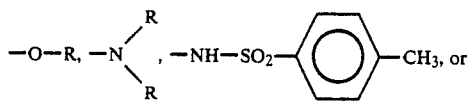

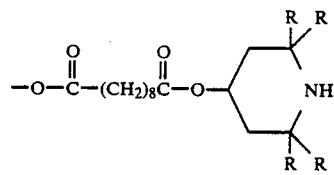

and R is an alkyl group having 1 to 6 carbon atoms. The compound represented by general formula (A) serves as a doublet oxygen quencher.

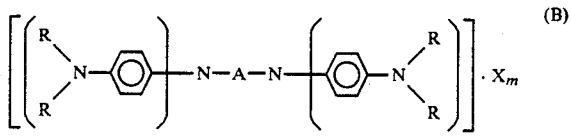
(B)

wherein R is a hydrogen atom or an alkyl group having 1 to 6 atoms, X is a perchlorate anion, a fluoroborate anion, or a hexafluorate anion, m is an integer of 0, 1, or 2, A is

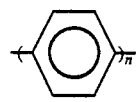

(wherein n is 1 or 2) when m=0 or 1 and

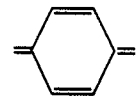

when m=2. Examples of such an amine compound are IRG-002 and IRG-003 (tradenames) commercially available from NIPPON KAYAKU CO., LTD. The compound represented by general formula (B) serves as an infrared ray absorber.

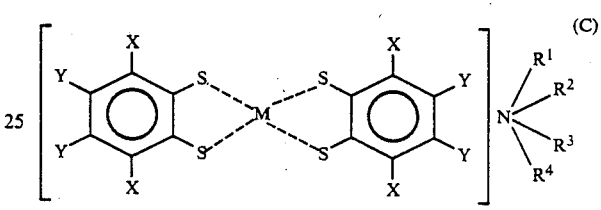
(C)

wherein each of $R^1$ to $R^4$ is independently an alkyl or phenyl group, each of X and Y is independently a hydrogen atom, an alkyl group, or a halogen group, and M is a metal such as Ni, Co, Fe, or Cr. Examples of the metal complex are PA1001 to PA1006 (tradenames) commercially available from Mitsui Toatsu Fine K.K., Ni-bis(o-xylene-4,5-diole)tetra(t-butyl)ammonium salt, and the like. The compound represented by general formula (C) serves as a doublet oxygen quencher.

An interlayer and a protective layer may be formed in the information recording medium, in addition to the recording layer containing a dye of the present invention. The interlayer improves an adhesion property of the recording layer with a substrate and protects the recording layer from oxygen and moisture. The interlayer can be made of a resin or an inorganic compound. Examples of the resin are polymers and copolymers of vinyl chloride, vinyl acetate, acryl, ester, nitrocellulose, carbonate, epoxy, ethylene, propylene, and butyral. An antioxide, an ultraviolet absorber, a levelling agent, a water repellent, or the like may be contained in the resin. The resin may be applied to the substrate by spinner coating or dipping, or using a doctor blade. Examples of the inorganic compound are $SiO_2$, SiO, $Al_2O_3$, $SnO_2$, and $MgF_2$. The inorganic compound film can be formed by an ion beam method, an electron beam method, or a sputtering method. The protective layer may be formed in the same manner as the interlayer. The protective layer aims at protecting the recording layer from light, oxygen, moisture, and dust and at preventing the layer from damage.

Structures of the optical information recording media according to the present invention will be described with reference to the accompanying drawings.

FIG. 1 shows a basic structure of the optical information recording medium. Recording layer 2 containing a dye of the present invention is formed on substrate 1. Laser beam 3 is focused by a focusing lens to form a laser spot having a diameter of 0.8 to 1.5 μm on layer 2 to write information in layer 2 or read it therefrom. Laser beam 3 may be incident from the side of layer 2. However, if substrate 1 is transparent, the beam is preferably incident from the side of substrate so that influences of contamination and dust on recording layer 2 can be minimized.

Figure 2:
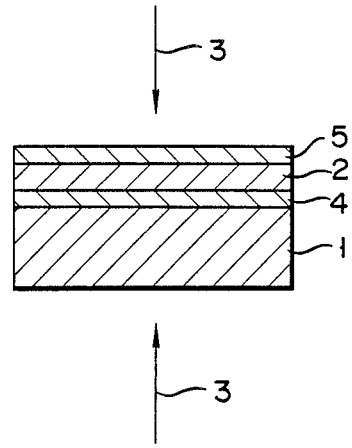

FIG. 2 shows a structure wherein interlayer 4 is formed between substrate 1 and recording layer 2, and protective layer 5 is formed on layer 2.

Figure 3:
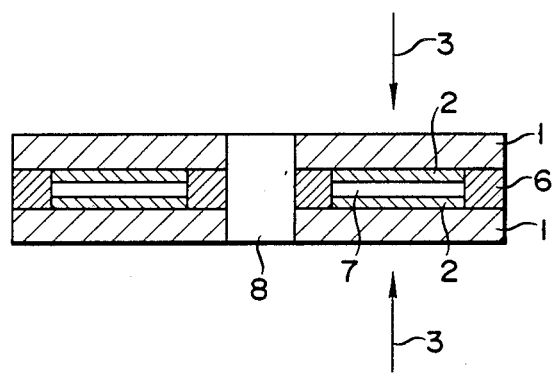

FIG. 3 shows a structure wherein two media having an identical constitution are bonded through spacer 6 such that recording layers 2 thereof oppose each other. Reference numeral 7 in FIG. 3 denotes an air gap; and 8, a spindle hole. With the above structure, good optical characteristics can be obtained, and the contamination and dust of recording layers 2 can be eliminated.

In the structures in FIGS. 1 to 3, an Al or Ag film or any other reflecting film may be formed between the substrate and the recording layer.

The present invention will be described in detail by way of its examples.

EXAMPLE 1

A dye represented by formula (7) was dissolved in dichloromethane to prepare a 2% solution. The solution was applied to a 1.2-mm thick glass substrate by a spinner coater and was then dried to prepare a 75-nm thick recording layer, thereby obtaining a recording medium.

The reflectance of the recording layer of the resultant recording medium was measured by a spectroscope to be 41% at the substrate side at a wavelength of 830 nm. A semiconductor laser beam having a wavelength of 830 nm was focused to form a 1.2-$\mu$m diameter beam spot on the recording medium, and the laser spot having an output power of 7 mW was scanned at a linear rate of 6 m/sec from the substrate side so as to write a 1-MHz signal. In this case, the recording sensitivity was 2.5 nJ/spot, and the read C/N value was 55 dB.

EXAMPLE 2

A dye represented by formula (11) was dissolved in methyl ethyl ketone to prepare a 2% solution. The solution was applied by a spinner coater to a 1.2-mm thick acrylic plate treated with an ultraviolet curing resin and was then dried to prepare a 70-nm thick recording layer, thereby obtaining a recording medium.

The reflectance of the recording layer of the resultant recording medium was measured by a spectroscope to be 40% at the substrate side at a wavelength of 830 nm. Following the same procedures as in Example 1, read and write operations were performed by using a semiconductor laser. Recording sensitivity was 2.2 nJ/spot, and the read C/N value was 55 dB.

EXAMPLE 3

A dye represented by formula (25) was dissolved in methyl ethyl ketone to prepare a 2% solution. The solution was applied by a spinner coater to a 1.2-mm thick acrylic plate treated with an ultraviolet curing resin and was then dried to prepare a 75-nm thick recording layer, thereby obtaining a recording medium.

The reflectance of the recording layer of the resultant recording medium was measured by a spectroscope to be 38% at the substrate side at a wavelength of 830 nm. Following the same procedures as in Example 1, read and write operations were performed by using a semiconductor laser. Recording sensitivity was 2.3 nJ/spot, and the read C/N value was 54 dB.

EXAMPLE 4

15% by weight of acrylic resin (Dianal BR-60: tradename available from Mitsubishi Rayon Co., Ltd.) as a binder resin were added to a dye represented by formula (44), and the mixture was dissolved in methyl ethyl ketone to prepare a 3% solution. The solution was applied by a spinner coater to a 1.2-mm thick acrylic plate treated with an ultraviolet curing resin. The dye layer was dried to prepare an 85-nm thick recording layer, thereby obtaining a recording medium.

The reflectance of the recording layer of the resultant recording medium was measured by a spectroscope to be 33% at the substrate side at a wavelength of 830 nm. Following the same procedures as in Example 1, read and write operations were performed by using a semiconductor laser. Recording sensitivity was 2.8 nJ/spot, and the read C/N value was 53 dB.

EXAMPLE 5

A dye represented by formula (7) was mixed with an infrared absorber (IRG-002: tradename available from NIPPON KAYAKU CO., LTD.) at a weight ratio of 4:1, and the resultant mixture was dissolved in methyl ethyl ketone to prepare a 3% solution. The solution was applied by a spinner coater to a 1.2-mm thick acrylic plate treated with an ultraviolet curing resin. The resultant layer was dried to form a 70-nm recording layer, thereby preparing a recording medium.

The reflectance of the recording layer of the resultant recording medium was measured by a spectroscope to be 38% at the substrate side at a wavelength of 830 nm. Following the same procedures as in Example 1, read and write operations were performed by using a semiconductor laser. Recording sensitivity was 2.6 nJ/spot, and the read C/N value was 54 dB.

EXAMPLE 6

A dye represented by formula (30) was mixed with a dye represented by formula (a) below at a weight ratio of 2:1, and the mixture was dissolved following the same procedures as in Example 2. The solution was applied to a 1.2-mm thick acrylic plate by a spinner coater and dried to form an 80-nm thick recording layer, thereby obtaining a recording medium.

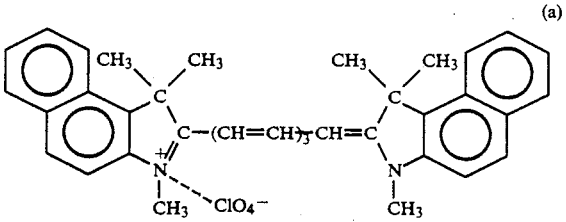
(a)

The reflectance of the recording layer of the resultant recording medium was measured by a spectroscope to be 40% at the substrate side at a wavelength of 830 nm. Following the same procedures as in Example 1, read and write operations were performed by using a semiconductor laser. Recording sensitivity was 2.1 nJ/spot, and the read C/N value was 55 dB.

EXAMPLE 7

A dye represented by formula (51) was applied to a glass substrate to form a 60-nm thick recording layer. Aluminum naphthalocyanine represented by formula (b) below was heated and vacuum-deposited on the recording layer at a vacuum of $1.0 \times 10^{-5}$ Torr to form a 30nm thick reflecting protective layer on the recording layer, thereby preparing a recording medium.

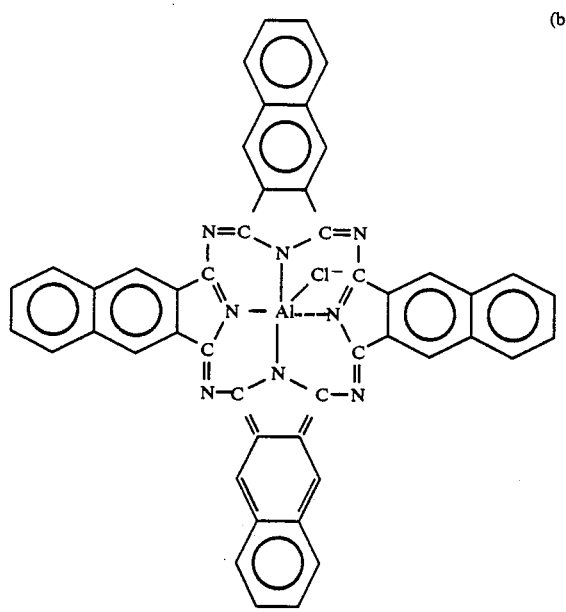

(b)

The reflectance of the recording layer of the resultant recording medium was measured by a spectroscope to be 43% at the substrate side at a wavelength of 830 nm. Following the same procedures as in Example 1, read and write operations were performed by using a semiconductor laser. Recording sensitivity was 2.3 nJ/spot, and the read C/N value was 52 dB.

EXAMPLE 7A

The same procedures were conducted as in Example 1, except that a dye of formula (22a) was used instead of the dye of formula (7).

COMPARATIVE EXAMPLE 1

A dye represented by the following formula (c) was dissolved in methyl ethyl ketone to prepare a 2% solution. The solution was applied by a spinner coater to a 1.2-mm thick acrylic plate treated with an ultraviolet curing resin. The dye layer was dried to prepare an 80-nm thick recording layer, thereby obtaining a recording medium.

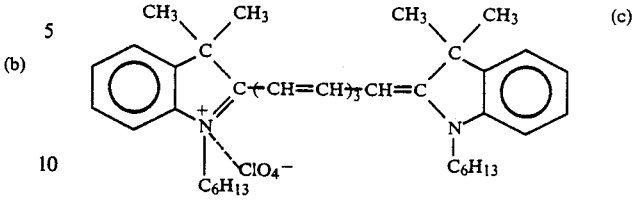

(c)

The reflectance of the recording layer of the resultant recording medium was measured by a spectroscope to be 35% at the substrate side at a wavelength of 830 nm. Following the same procedures as in Example 1, read and write operations were performed by using a semiconductor laser. Recording sensitivity was 2.8 nJ/spot, and the read C/N value was 52 dB.

COMPARATIVE EXAMPLE 2

A dye represented by the following formula (d) was dissolved in dichloromethane to prepare a 2% solution. The solution was applied by a spinner coater to a 1.2-mm thick glass plate treated with an ultraviolet curing resin. The dye layer was dried to prepare a 70-nm thick recording layer, thereby obtaining a recording medium.

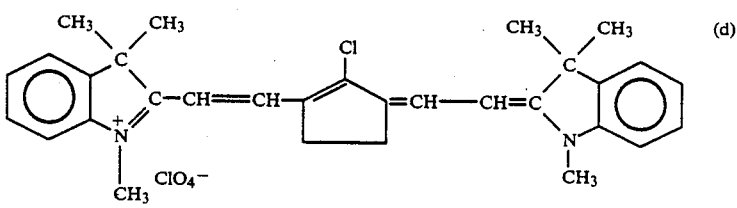

(d)

The reflectance of the recording layer of the resultant recording medium was measured by a spectroscope to be 32% at the substrate side at a wavelength of 830 nm. Following the same procedures as in Example 1, read and write operations were performed by using a semiconductor laser. Recording sensitivity was 2.4 nJ/spot, and the read C/N value was 52 dB.

COMPARATIVE EXAMPLE 3

A dye represented by the following formula (e) was dissolved in ethyl methyl ketone to prepare a 2% solution. The solution was applied by a spinner coater to a 1.2-mm thick acrylic plate treated with an ultraviolet curing resin. The dye layer was dried to prepare a 70-nm thick recording layer, thereby obtaining a recording medium.

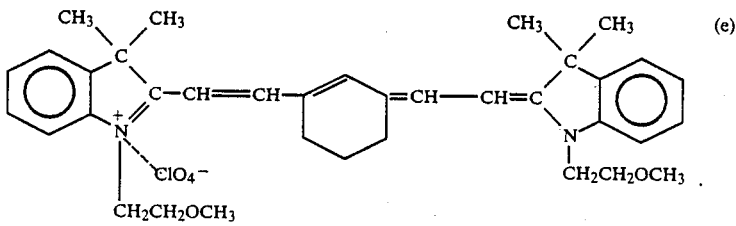

(e)

The reflectance of the recording layer of the resultant recording medium was measured by a spectroscope to be 39% at the substrate side at a wavelength of 830 nm. Following the same procedures as in Example 1, read and write operations were performed by using a semiconductor laser. Recording sensitivity was 2.2 nJ/spot, and the read C/N value was 54 dB.

COMPARATIVE EXAMPLE 4

A dye represented by the following formula (f) was dissolved in dichloromethane to prepare a 2% solution. The solution was applied by a spinner coater to a 1.2-mm thick glass plate treated with an ultraviolet curing resin. The dye layer was dried to prepare a 70-nm thick recording layer, thereby obtaining a recording medium.

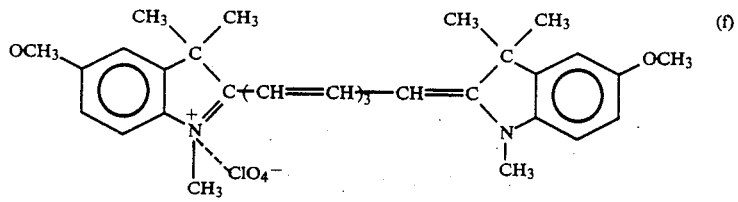

The reflectance of the recording layer of the resultant recording medium was measured by a spectroscope to be 30% at the substrate side at a wavelength of 830 nm. Following the same procedures as in Example 1, read and write operations were performed by using a semiconductor laser. Recording sensitivity was 3.1 nJ/spot, and the read C/N value was 51 dB.

The recording media prepared in Examples 1 to 7A and Comparative Examples 1 to 4 were exposed in an atmosphere at a temperature of 50° C. and a relative humidity of 95% for 500 hours. The rates of decreases in reflectances of the recording media before and after the heat and moisture resistance test were measured. The light resistance test was made such that a 500-W tungsten beam was incident on each recording medium from a position away from the surface by 50 cm in an atmosphere having a temperature of 25° C. and a humidity of 60% for 100 hours. The rates of changes in read degradation before and after continuous radiation of a 10-mW laser beam for 30 minutes were measured as changes in C/N values. These results are summarized in Table 1 below.

was applied to a 1.2-mm thick glass substrate by a spinner coater and was then dried to prepare an 80-nm thick recording layer, thereby obtaining a recording medium.

The reflectance of the recording layer of the resultant recording medium was measured by a spectroscope to be 35% at the substrate side at a wavelength of 830 nm. A semiconductor laser beam having a wavelength of 830 nm was focused to form a 1.2-$\mu$m diameter beam spot on the recording medium, and the laser spot having an output power of 7 mW was scanned at a linear rate of 6 m/sec from the substrate side so as to write a 1-MHz signal. In this case, the recording sensitivity was 2.3 nJ/spot, and the read C/N value was 55 dB.

EXAMPLE 9

A dye represented by formula (61) was dissolved in methyl ethyl ketone to prepare a 2% solution. The solution was applied by a spinner coater to a 1.2-mm thick acrylic plate treated with an ultraviolet curing resin and was then dried to prepare a 70-nm thick recording layer, thereby obtaining a recording medium.

The reflectance of the recording layer of the resultant recording medium was measured by a spectroscope to be 42% at the substrate side at a wavelength of 830 nm. Following the same procedures as in Example 8, read and write operations were performed by using a semiconductor laser. Recording sensitivity was 2.0 nJ/spot, and the read C/N value was 55 dB.

EXAMPLE 10

A dye represented by formula (73) was dissolved in methyl ethyl ketone to prepare a 2% solution. The solution was applied by a spinner coater to a 1.2-mm thick acrylic plate treated with an ultraviolet curing resin and was then dried to prepare a 75-nm thick recording layer, thereby obtaining a recording medium.

TABLE 1

| | Heat and Moisture Resistance Test: Rate of Decrease in Reflectance (%) | Light Resistance Test: Rate of Decrease in Reflectance (%) | Read Degradation: C/N Value (d/B) | Film Formation Property |
|---|---|---|---|---|
| Example 1 | 10 | 9 | 48 | O |
| 2 | 9 | 8 | 47 | O |
| 3 | 10 | 7 | 48 | O |
| 4 | 7 | 9 | 47 | O |
| 5 | 10 | 6 | 50 | O |
| 6 | 8 | 8 | 49 | O |
| 7 | 3 | 4 | 50 | O |
| 7A | 7 | 7 | 53 | O |
| Comparative Example 1 | 32 | 25 | * | O |
| 2 | 14 | 13 | 40 | Δ |
| 3 | 17 | 6 | 43 | Δ |
| 4 | 35 | 17 | 36 | O |

*Not measurable due to degradation

EXAMPLE 8

A dye represented by formula (70) was dissolved in dichloromethane to prepare a 2% solution. The solution The reflectance of the recording layer of the resultant recording medium was measured by a spectroscope to be 39% at the substrate side at a wavelength of 830 nm. Following the same procedures as in Example 8, read and write operations were performed by using a semiconductor laser. Recording sensitivity was 2.1 nJ/spot, and the read C/N value was 53 dB.

EXAMPLE 11

15% by weight of acrylic resin (Dianal BR-60: tradename available from Mitsubishi Rayon Co., Ltd.) as a binder resin were added to a dye represented by formula (94), and the mixture was dissolved in methyl ethyl ketone to prepare a 3% solution. The solution was applied by a spinner coater to a 1.2-mm thick acrylic plate treated with an ultraviolet curing resin. The dye layer was dried to prepare a 90-nm thick recording layer, thereby obtaining a recording medium.

The reflectance of the recording layer of the resultant recording medium was measured by a spectroscope to be 32% at the substrate side at a wavelength of 830 nm. Following the same procedures as in Example 8, read and write operations were performed by using a semiconductor laser. Recording sensitivity was 2.5 nJ/spot, and the read C/N value was 52 dB.

EXAMPLE 12

A dye represented by formula (66) was mixed with an infrared absorbor (IRG-002: tradename available from NIPPON KAYAKU CO., LTD.) at a weight ratio of 4:1, and the resultant mixture was dissolved in methyl ethyl ketone to prepare a 3% solution. The solution was applied by a spinner coater to a 1.2-mm thick acrylic plate treated with an ultraviolet curing resin. The resultant layer was dried to form a 60-nm recording layer, thereby preparing a recording medium.

The reflectance of the recording layer of the resultant recording medium was measured by a spectroscope to be 42% at the substrate side at a wavelength of 830 nm. Following the same procedures as in Example 8, read and write operations were performed by using a semiconductor laser. Recording sensitivity was 2.0 nJ/spot, and the read C/N value was 60 dB.

EXAMPLE 13

A dye represented by formula (66) was mixed with a dye represented by formula (a) used in Example 6 at a weight ratio of 2:1, and the mixture was dissolved following the same procedures as in Example 9. The solution was applied to a 1.2-mm thick acrylic plate by a spinner coater and dried to form an 80-nm thick recording layer, thereby obtaining a recording medium.

The reflectance of the recording layer of the resultant recording medium was measured by a spectroscope to be 41% at the substrate side at a wavelength of 830 nm. Following the same procedures as in Example 8, read and write operations were performed by using a semiconductor laser. Recording sensitivity was 1.8 nJ/spot, and the read C/N value was 55 dB.

EXAMPLE 14

A dye represented by formula (66) was applied to a glass substrate to form a 60-nm thick recording layer. Aluminum naphthalocyanine used in Example 7 was heated and vacuum-deposited on the recording layer at a vacuum of $1.0 \times 10^{-5}$ Torr to form a 20-nm thick reflecting protective layer on the recording layer, thereby preparing a recording medium.

The reflectance of the recording layer of the resultant recording medium was measured by a spectroscope to be 43% at the substrate side at a wavelength of 830 nm. Following the same procedures as in Example 8, read and write operations were performed by using a semiconductor laser. Recording sensitivity was 2.1 nJ/spot, and the read C/N value was 52 dB.

COMPARATIVE EXAMPLE 5

A dye represented by the following formula (g) was dissolved in dichloromethane to prepare a 2% solution. The solution was applied by a spinner coater to a 1.2-mm thick glass plate treated with an ultraviolet curing resin. The dye layer was dried to prepare a 70-nm thick recording layer, thereby obtaining a recording medium.

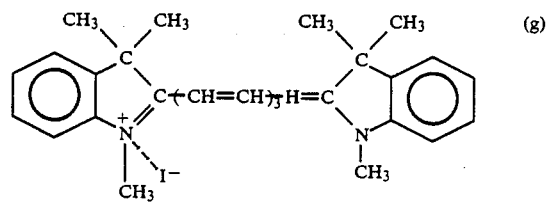

The reflectance of the recording layer of the resultant recording medium was measured by a spectroscope to be 45% at the substrate side at a wavelength of 830 nm. Following the same procedures as in Example 8, read and write operations were performed by using a semiconductor laser. Recording sensitivity was 3.1 nJ/spot, and the read C/N value was 50 dB.

The recording media prepared in Examples 8 to 14 and Comparative Example 5 were subjected to the heat and moisture resistance test, the light resistance test, the read degradation test, and the film formation property test in the same manner as described previously. The obtained results are shown in Table 2 below.

TABLE 2

| | Heat and Moisture Resistance Test: Rate of Decrease in Reflectance (%) | Light Resistance Test: Rate of Decrease in Reflectance (%) | Read Degradation: C/N Value (d/B) | Film Formation Property |
|---|---|---|---|---|
| Example 8 | 9 | 8 | 40 | O |
| 9 | 10 | 9 | 47 | O |
| 10 | 11 | 10 | 47 | O |
| 11 | 10 | 9 | 46 | O |
| 12 | 8 | 5 | 50 | O |
| 13 | 7 | 4 | 49 | O |
| 14 | 2 | 3 | 49 | O |
| Comparative Example 5 | 34 | 25 | * | O |

*Not measurable due to degradation

EXAMPLE 15

The dye of formula (22a) and the dye of formula (66) were mixed at a weight ratio of 3:1. The mixture was added with a dithiolate complex PA1006 (available from Mitsui Toatsu) at a weight ratio of 9:1 and was dissolved in methyl ethyl ketone to prepare a 3% solution. The solution was applied by a spinner coater on a 1.2 mm thick acrylic plate treated with an ultraviolet curing resin, and dried to form a recording layer having a thickness of 65 nm.

The reflectance of the recording layer was 35% at the substrate side at a wavelength of 830 nm.

As in Example 1, read and write operations were performed by using a semiconductor laser. Recording sensitivity was 2.2 nJ/spot, and the read CN value was 60 dB.

In summary, the present invention provides a pollution-free optical information recording medium which has high reflectance and recording sensitivity, is capable of stable read/write operations of light signals, and has high stability against read light, sunlight, and moisture.

What is claimed is:

1. An optical information recording medium comprising:

an optical information recording layer; and
   a carrier for carrying said recording layer,
   said recording layer comprising at least one organic dye represented by a formula:

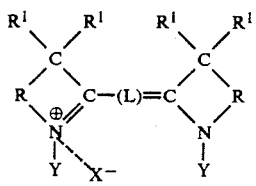

where R is

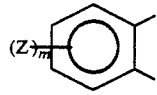

1,2-napththylene group, 2,3-naphthylene group, or 3,4-naphthylene group;

Z is a hydrogen atom, a halogen atom, an alkyl group having 1 to 18 carbon atoms, allyl group, nitro group, hydroxyl group, carboxyl group, an alkoxyl group, —OCF$_3$,—OSF$_3$, —R$^2$OH, —R$^2$CHO, —R$^2$COOH, —R$^2$OR$^3$, —R$^2$COR$^3$, —R$^2$COOR$^3$, —COR$^3$, —COOR$^3$,

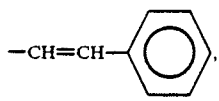

—CH=CH—CN, —NH$_2$N(R$^3$)$_2$, —NHCOCH$_3$, or

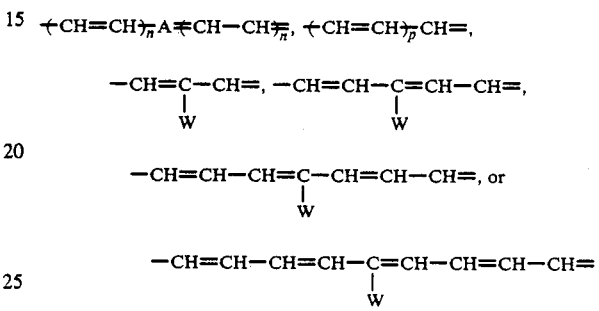

m is an integer of 1 to 4;
R$^1$ is an alkyl group having 1 to 6 carbon atoms, an aralkyl group, or phenyl group;
R$^2$ is an alkylene group having 1 to 20 carbon atoms;
R$^3$ is an alkyl group having 1 to 18 carbon atoms;
L is $+CH=CH\rangle_{\overline{n}}A+CH-CH\rangle_{\overline{n}}$, $+CH=CH\rangle_{\overline{p}}CH=$, $-CH=C-CH=$, $-CH=CH-C=CH-CH=$,
       |                    |
       W                    W $-CH=CH-CH=C-CH=CH-CH=$, or
              |
              W $-CH=CH-CH=CH-C=CH-CH=CH=$
                    |
                    W n is 0, 1 or 2;
p is an integer of 1 to 4;

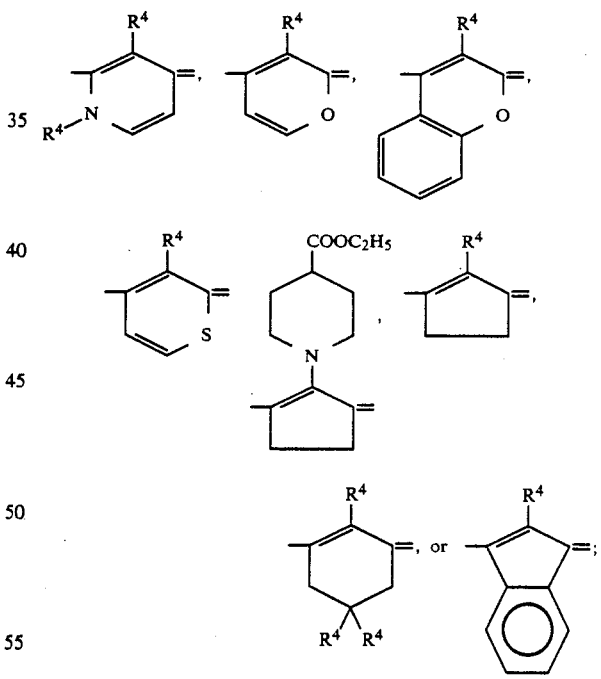

W is a monovalent group;
R$^4$ is a hydrogen atom, a halogen atom, an alkyl group having 1 to 6 carbon atoms, phenyl group, an aralkyl group, allyl group,

(where Ph is phenyl), or

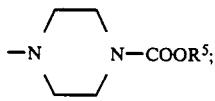

R⁵ is an alkyl group having 1 to 6 carbon atoms;
X is an anion; and
Y is unsaturated organic group having 2 to 20 carbon atoms and is selected from the group consisting of an allyl group, a vinyl group, an allylidene group, an allyloxy group, a crotonoyl group, a styryl group, a vinylidene group, a vinylene group, a diene group, a methylidene group, an acryloyl group, a methacryloyl group, an isopropenyl group, an ethynyl group, and a butenyl group and which imparts improved solubility, film formability and wettability to the dye.

2. The medium according to claim 1, wherein said organic dye has a formula:

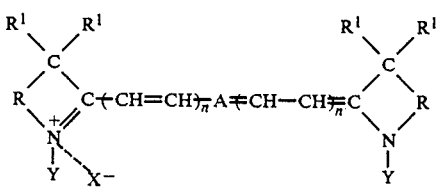

where R, R¹, X, Y, A and n are as defined in claim 1.

3. The medium according to claim 1, wherein said organic dye has a formula:

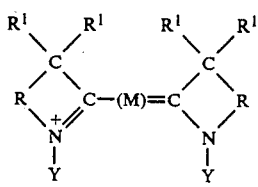

where M is

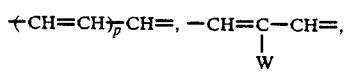

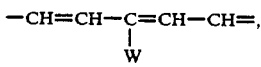

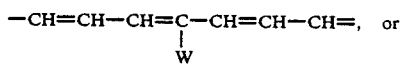

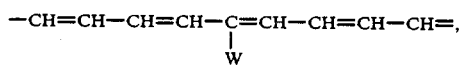

and R, R¹, X, Y, W and p are as defined in claim 1.

4. The medium according to claim 1, wherein said Y is a substituted or unsubstituted allyl, vinyl, allylidene, allyloxy, crotonoyl, styryl, vinylidene, vinylene, diene, methylidine, acryloyl, methacryloyl, isopropenyl, ethynyl or butenyl group.

5. The medium according to claim 1, wherein said Y is —CH₂CH=CH₂, —C₂H₄CH=CH₂, —C₃H₆CH=CH₂, —CH₂OCH₂CH=CH₂, —CH₂COOCH=CH₂, —CH₂CH=CH—CH=CH₂, —CH₂OCOC(CH₃)=CH₂,

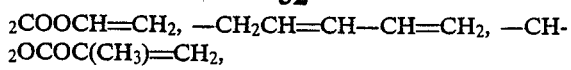

, —C₂H₄COOCH₂CH=CH₂, —CH=CH₂, —CH₂OCOCH=CH₂, —CH₂CH₂CH(CH₃)CH=CH₂, —C₄H₈CH=CH₂, —CH₂OCOCH₂CH=CH₂, —C₈H₁₆COCH=CH₂, CH₃CHCH=CH₂, —C₂H₄OCH₂CH=CH₂, —CH₃H₆COOCH₂CH=CH₂, —CH₂COCH₂CH=CH₂, —C₂H₄OOC(CH₃)=CH₂, —CH₂CH=CHCH₃, —CH₂C(CH₃)=CH₂, —CH₂OOCC(CH₃)=CH₂, —C₂H₄OOCCH=CH₂, —C₄H₈COOCH₂CH=CH₂, —C₈H₁₆CH=CH₂, —C₃H₆OCO—C(CH₃)=CH₂, —CH₂COOCH=CH₂, or —CH=CHCH₃.

6. The medium according to claim 1, wherein said Y is allyl group.

7. The medium according to claim 6, wherein said L is —(CH=CH)ₙA=(CH—CH)ₙ or —(CH=CH)ₚCH=, and A is

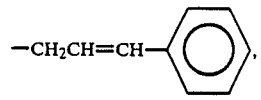

8. The medium of claim 1 wherein R¹ is C₁-C₆ alkyl.

9. The medium of claim 1 wherein R¹ is aralkyl or phenyl.

10. The medium according to claim 2, wherein said Y is substituted or unsubstituted allyl, vinyl, allylidene, allyloxy, crotonyl, styryl, vinylidene, vinylene, diene, methylidine, acryloyl, methacryloyl, isopropenyl, ethynyl or butenyl group.

11. The medium according to claim 2, wherein said Y is —CH₂CH=CH₂, —C₂H₄CH=CH₂, —C₃H₆CH=CH₂, —CH₂OCH₂CH=CH₂, —CH₂COOCH=CH₂, —CH₂CH=CH—CH=CH₂, —CH₂OCOC(CH₃)=CH₂,

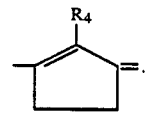

, —C₂H₄COOCH₂CH=CH₂, —CH=CH₂, —CH₂OCOCH=CH₂, —CH₂CH₂CH(CH₃)CH=CH₂, —C₄H₈CH=CH₂, —CH₂OCOCH₂CH=CH₂, —C₈H₁₆COCH=CH₂, CH₃CHCH=CH₂, —C₂H₄OCH₂CH=CH₂, —CH₃H₆COOCH₂CH=CH₂, —CH₂COCH₂CH=CH₂, —C₂H₄OOC(CH₃)=CH₂, —CH₂CH=CHCH₃, —CH₂C(CH₃)=CH₂, —CH₂OOCC(CH₃)=CH₂, —C₂H₄OOCCH=CH₂, —C₄H₈COOCH₂CH=CH₂, —C₈H₁₆CH=CH₂, —C₃H₆OCO—C(CH₃)=CH₂, —CH₂COOCH=CH₂, or —CH=CHCH₃.

12. The medium according to claim 2, wherein said L is —(CH=CH)ₙA=(CH—CH)ₙ or —(CH=CH)ₚCH=, and A is

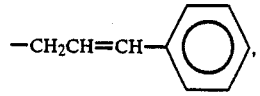

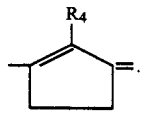

13. The medium of claim 1 wherein $R^1$ is $C_1$-$C_6$ alkyl.

14. The medium of claim 1 wherein $R^1$ is aralkyl.

15. The medium according to claim 3, wherein said Y is substituted or unsubstituted allyl, vinyl, allylidene, allyloxy, crotonyl, styryl, vinylidene, vinylene, diene, methylidine, acryloyl, methacryloyl, isopropenyl, ethynyl or butenyl group.

16. The medium according to claim 3, wherein said Y is —CH$_2$CH=CH$_2$, —C$_2$H$_4$CH=CH$_2$, —C$_3$H$_6$CH=CH$_2$, —CH$_2$OCH$_2$CH=CH$_2$, —CH$_2$CH$_2$COOCH=CH$_2$, —CH$_2$CH=CH—CH=CH$_2$, —CH$_2$OCOC(CH$_3$)=CH$_2$,

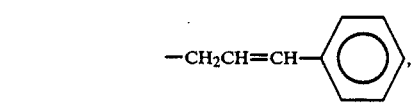

—C$_2$H$_4$COOCH$_2$CH=CH$_2$, —CH=CH$_2$, —CH$_2$OCOCH=CH$_2$, —CH$_2$CH$_2$CH(CH$_3$)CH=CH$_2$, —C$_4$H$_8$CH=CH$_2$, —CH$_2$OCOCH$_2$CH=CH$_2$, —C$_8$H$_{16}$COCH=CH$_2$, CH$_3$CHCH=CH$_2$, —C$_2$H$_4$OCH$_2$CH=CH$_2$, —CH$_3$H$_6$COOCH$_2$CH=CH$_2$, —CH$_2$COCH$_2$CH=CH$_2$, —C$_2$H$_4$OOC(CH$_3$)=CH$_2$, —CH$_2$CH=CHCH$_3$, —CH$_2$C(CH$_3$)=CH$_2$, —CH$_2$OOCC(CH$_3$)=CH$_2$, —C$_2$H$_4$OOCCH=CH$_2$, —C$_4$H$_8$COOCH$_2$CH=CH$_2$, —C$_8$H$_{16}$CH=CH$_2$, —C$_3$H$_6$OCO—C(CH$_3$)=CH$_2$, —CH$_2$COOCH=CH$_2$, or —CH=CHCH$_3$.

17. The medium according to claim 3, wherein said Y is allyl group.

18. The medium according to claim 17, wherein said L is —(CH=CH)$_n$A=(CH—CH)$_n$ or —(CH=CH)$_p$CH=, and A is

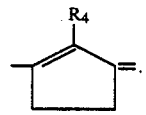

19. The medium of claim 3 wherein $R^1$ is $C_1$-$C_6$ alkyl.

20. The medium of claim 3 wherein $R^1$ is aralkyl or phenyl.

21. The medium according to claim 2 wherein said Y is an allyl group.

* * * * *